United States Patent
Iwata et al.

(10) Patent No.: US 9,594,519 B2
(45) Date of Patent: Mar. 14, 2017

(54) PREFETCHING MONITORED AREAS IN A STORAGE APPARATUS

(71) Applicant: FUJITSU LIMITED, Kawasaki-shi, Kanagawa (JP)

(72) Inventors: Satoshi Iwata, Yokohama (JP); Kazuichi Oe, Yokohama (JP); Motoyuki Kawaba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 82 days.

(21) Appl. No.: 14/682,145

(22) Filed: Apr. 9, 2015

(65) Prior Publication Data
US 2015/0301757 A1 Oct. 22, 2015

(30) Foreign Application Priority Data

Apr. 18, 2014 (JP) .................................. 2014-086849

(51) Int. Cl.
*G06F 3/06* (2006.01)
*G06F 12/08* (2016.01)
*G06F 11/00* (2006.01)

(52) U.S. Cl.
CPC ............ *G06F 3/0619* (2013.01); *G06F 3/065* (2013.01); *G06F 3/068* (2013.01); *G06F 3/0611* (2013.01); *G06F 3/0635* (2013.01); *G06F 3/0653* (2013.01); *G06F 3/0665* (2013.01); *G06F 3/0689* (2013.01); *G06F 11/00* (2013.01); *G06F 12/0862* (2013.01)

(58) Field of Classification Search
CPC .... G06F 3/0611; G06F 3/0653; G06F 3/0655; G06F 12/0862
See application file for complete search history.

(56) References Cited

U.S. PATENT DOCUMENTS

| 6,173,362 B1 | 1/2001 | Yoda | |
|---|---|---|---|
| 8,775,741 B1 * | 7/2014 | de la Iglesia | ....... G06F 12/0862 711/137 |
| 2007/0005905 A1 * | 1/2007 | Yasue | ................... G06F 9/3832 711/137 |
| 2010/0115206 A1 * | 5/2010 | de la Iglesia | ....... G06F 12/0862 711/137 |

FOREIGN PATENT DOCUMENTS

| JP | 6-290274 | 10/1994 |
|---|---|---|
| JP | 10-187505 | 7/1998 |
| JP | 2008-293111 | 12/2008 |

* cited by examiner

*Primary Examiner* — Hal Schnee
(74) *Attorney, Agent, or Firm* — Fujitsu Patent Center

(57) ABSTRACT

From unit storage areas each having a certain size in a first storage device, an extraction unit extracts, at certain time intervals, a monitored area formed by consecutive unit storage areas having been accessed at least a predetermined number of times that is greater than zero and being similar to each other in the number of times of access. When detecting movement between the positions of same-sized monitored areas among the extracted monitored areas over time, a prediction unit determines a predicted storage area predicted to be accessed in the storage area of the first storage device on the basis of the direction of the movement between the positions of the same-sized monitored areas, and performs a control operation so that the content of the predicted storage area is copied to a second storage device that provides faster access than the first storage device.

13 Claims, 18 Drawing Sheets

FIG. 8

HIGH LOAD AREA INFORMATION TABLE 121

| DETECTED TIME | START ADDRESS | AREA SIZE | AVERAGE ACCESS NUMBER | DURATION TIME |
|---|---|---|---|---|
| t1 | 0 | 512 | 2208 | 1 |
| t1 | 5000 | 256 | 3010 | 1 |
| t1 | 12000 | 768 | 4562 | 1 |
| t1+1 | 256 | 512 | 2208 | 1 |
| t1+1 | 5512 | 256 | 6002 | 1 |
| t1+1 | 12000 | 768 | 4522 | 2 |
| ... | ... | ... | ... | ... |

| PREFETCH MANAGEMENT TABLE | | | | 122 |
|---|---|---|---|---|
| READ SOURCE ADDRESS | WRITE DESTINATION ADDRESS | AREA SIZE | PREFETCHED TIME | |
| 0 | 0 | 256 | 2014/3/3 00:01:00 | |
| 256 | 256 | 256 | 2014/3/3 00:02:00 | |
| 12000 | 1000 | 64 | 2014/3/4 00:01:00 | |
| 12064 | 1064 | 64 | 2014/3/4 00:02:00 | |
| ⋮ | ⋮ | ⋮ | ⋮ | |

FIG. 9

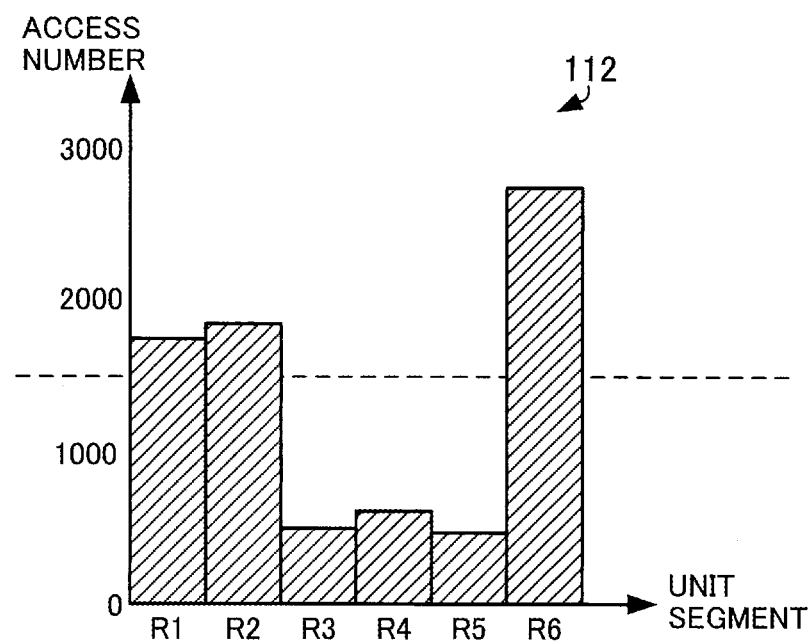
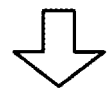
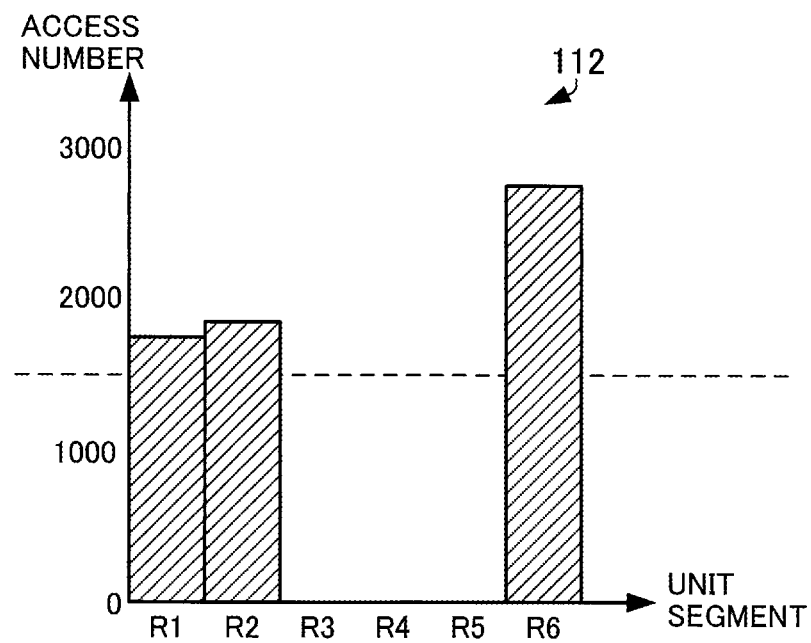
FIG. 10

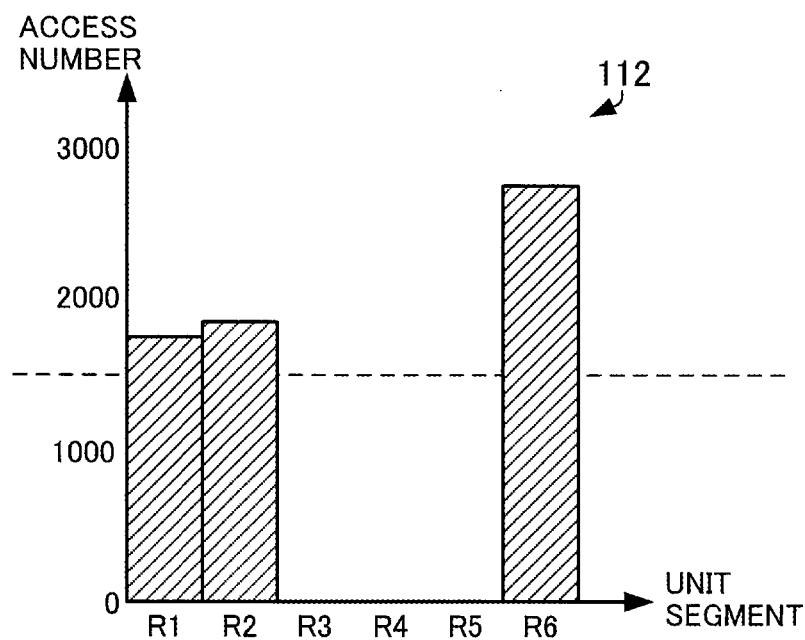
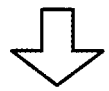
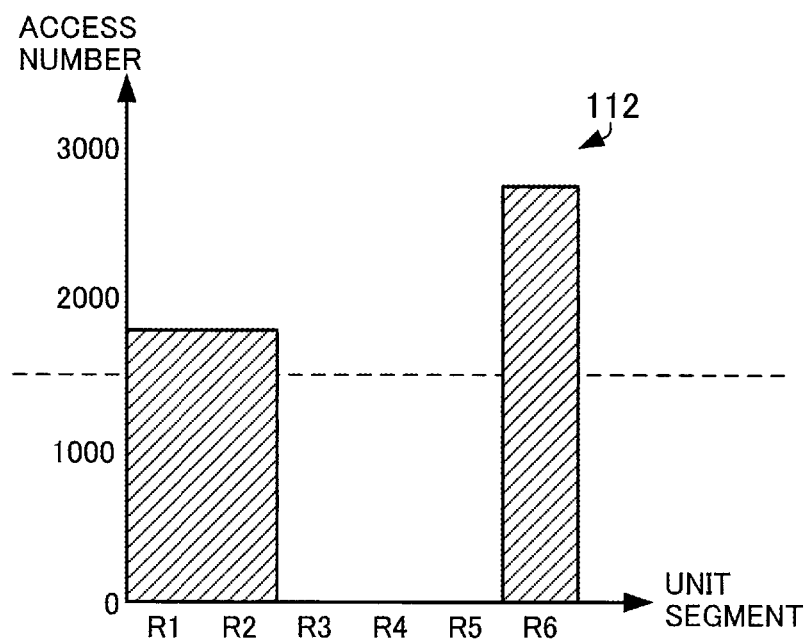
FIG. 11

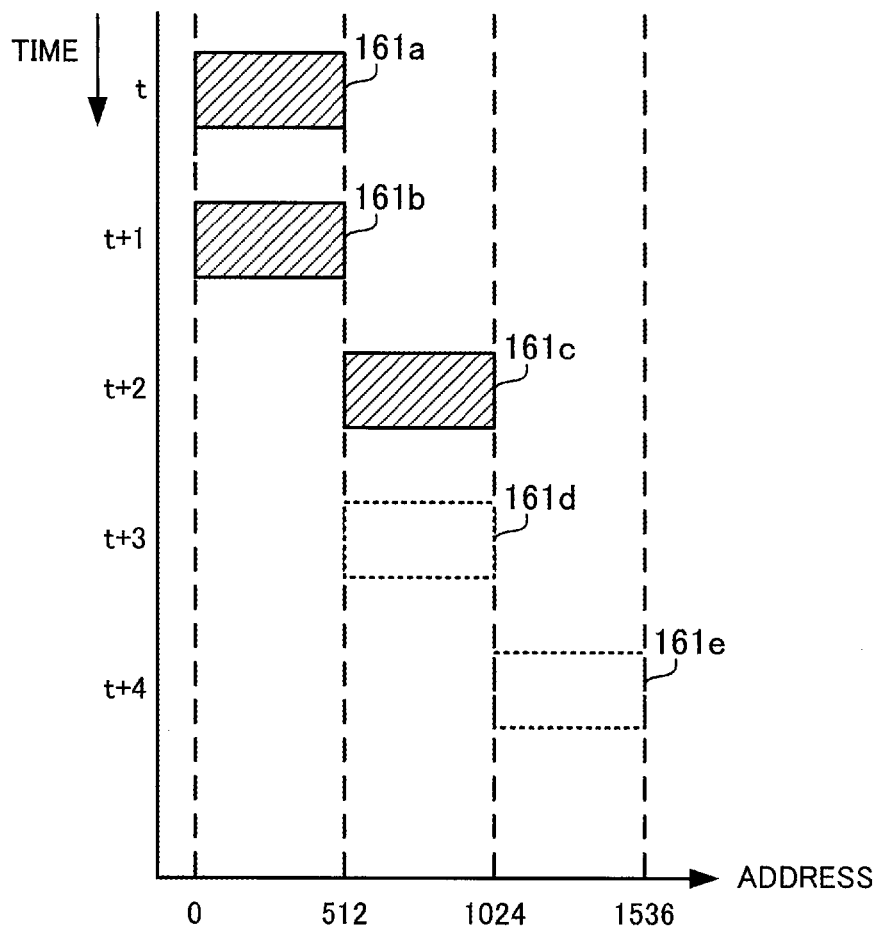
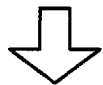
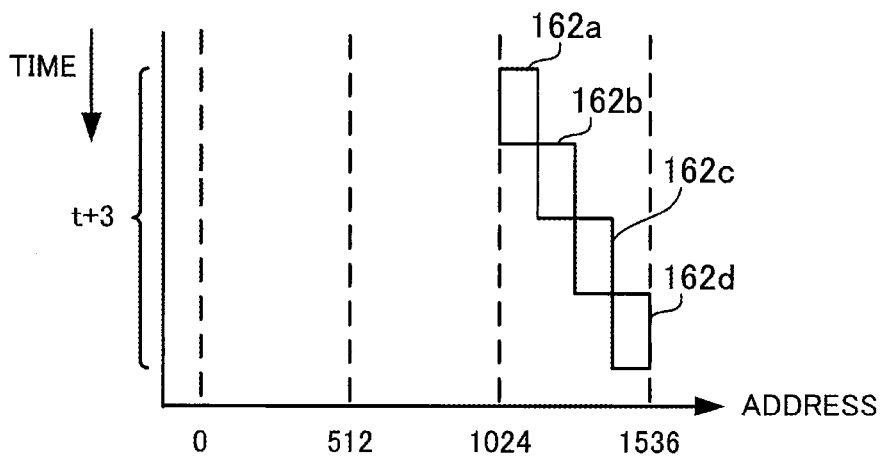
FIG. 13

PREFETCHING MONITORED AREAS IN A STORAGE APPARATUS

CROSS-REFERENCE TO RELATED APPLICATION

This application is based upon and claims the benefit of priority of the prior Japanese Patent Application No. 2014-086849, filed on Apr. 18, 2014, the entire contents of which are incorporated herein by reference.

FIELD

The embodiments discussed herein relate to a storage apparatus and a storage control method.

BACKGROUND

Prefetch techniques have been used in storage systems, in order to improve the speed of the response to access requests from host apparatuses. "Prefetch" means predicting data that is more likely to be accessed by a host apparatus in the near future, reading the data in advance from a corresponding storage device, and storing the data in advance in a faster storage device. When a host apparatus requests access to such prefetched data, a control device in the storage system performs processing on the basis of the access request by accessing the faster storage device, not the corresponding storage device. Namely, if the host apparatus accesses more prefetched data, the speed of the response to the host apparatus is increased further. Therefore, the response performance is improved.

In one typical prefetch technique, when sequential access is requested by a host apparatus, data ahead of the requested data is prefetched to a faster storage area.

In another prefetch technique, first, an adjacent area is determined on the basis of an access command log and the current access command. Next, if the access rate of the determined adjacent area represents a certain value or more, the data in this area adjacent to a storage area specified by the current access command is prefetched to a cache memory.

See Japanese Laid-open Patent Publication No. 2008-293111, for example.

According to the above technique in which data is prefetched when sequential access is requested by a host apparatus, limited conditions are used to determine the data to be prefetched. Namely, the speed of the response to access requests is not improved sufficiently.

SUMMARY

In one aspect of the embodiments, there is provided a storage apparatus including: a first storage device including a plurality of unit storage areas each having a certain size; a second storage device that provides faster access than the first storage device; and a control device that controls access to the first storage device, wherein: the control device extracts, from the plurality of unit storage areas, a monitored area formed by consecutive unit storage areas at certain time intervals, the consecutive unit storage areas having been accessed at least a predetermined number of times that is greater than zero and being similar to each other in the number of times of access; the control device determines, upon detecting movement between positions of same-sized monitored areas among extracted monitored areas in the first storage device over time, a first storage area out of the plurality of unit storage areas on the basis of direction of the movement between the same-sized monitored areas, the first storage area being predicted to be accessed; the control device performs a first control operation so that content of the first storage area is copied to a second storage area of the second storage device; and the control device performs, upon receiving a request for access to the first storage area, a second control operation so that the second storage area is accessed instead of the first storage area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an exemplary high load area information table;

FIG. 9 illustrates an exemplary prefetch management table;

FIG. 10 illustrates an exemplary operation of detecting high load areas;

FIG. 11 illustrates an exemplary operation that follows the operation illustrated in FIG. 10;

FIG. 13 illustrates an exemplary method of prefetching data;

DESCRIPTION OF EMBODIMENTS

Several embodiments will be described below with reference to the accompanying drawings.

First Embodiment

Figure 1:
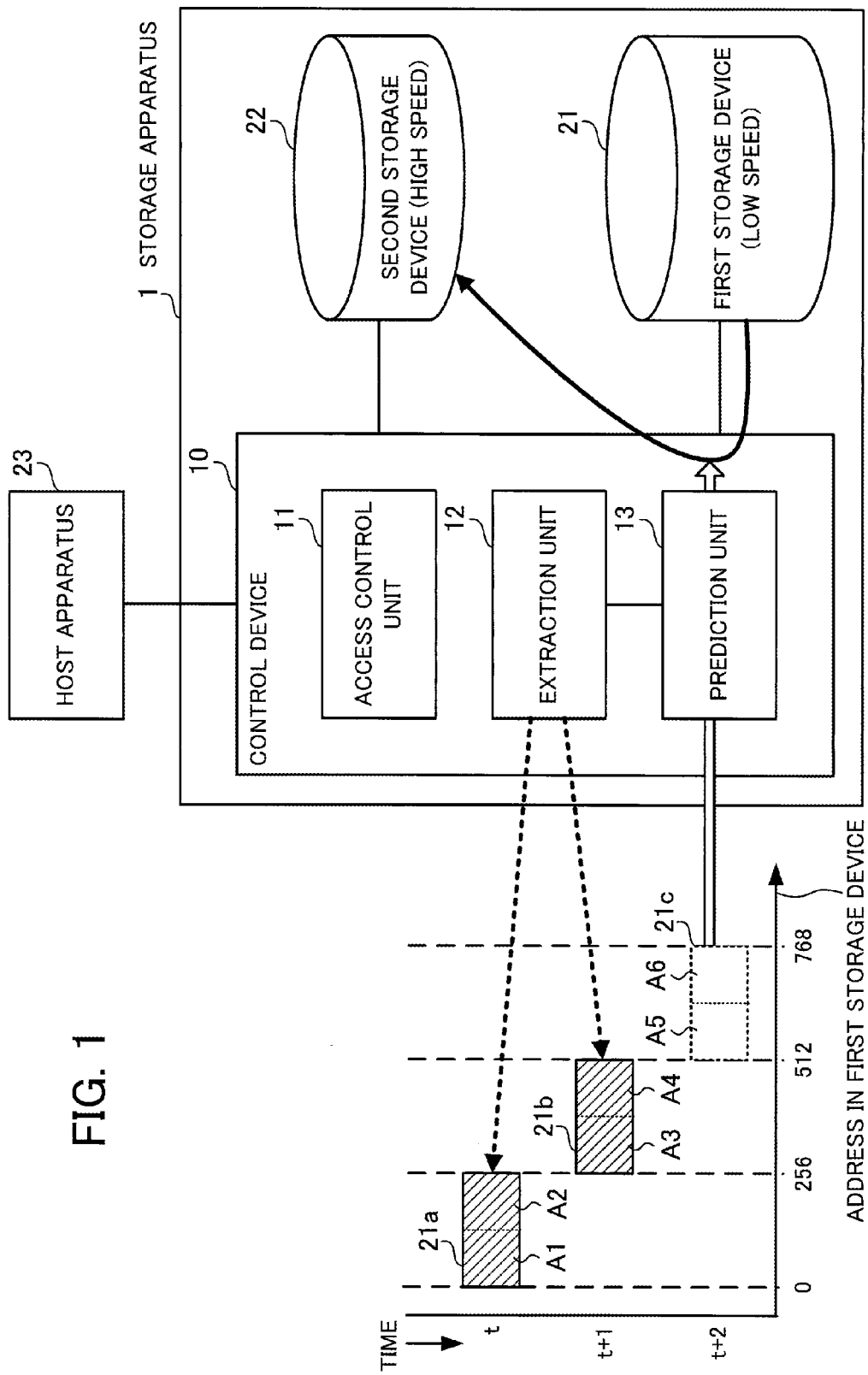
FIG. 1 illustrates an exemplary configuration and operation of a storage system according to a first embodiment.

FIG. 1 illustrates an exemplary configuration and operation of a storage apparatus 1 according to a first embodiment. The storage apparatus 1 according to the first embodiment includes a control device 10, a first storage device 21, and a second storage device 22.

For example, the first storage device 21 includes a hard disk drive (HDD) as a recording medium. The second storage device 22 is a storage device whose access speed is faster than that of the first storage device 21. For example, the second storage device 22 includes a solid state drive (SSD) as a recording medium. At least one of the first and second storage devices 21 and 22 may be arranged outside the storage apparatus 1. At least one of the first and second storage devices 21 and 22 may be arranged inside the control device 10.

The control device 10 controls access to the first and second storage devices 21 and 22. In addition, the control device 10 is connected to a host apparatus 23. The host apparatus 23 transmits a request for access to a storage area in the first storage device 21 to the control device 10. The control device 10 performs access processing on the basis of the access request from the host apparatus 23.

The control device 10 includes an access control unit 11, an extraction unit 12, and a prediction unit 13.

The access control unit 11 receives and responds to an access request from the host apparatus 23. When the access control unit 11 receives a request for access to a storage area in the first storage device 21, if the second storage device 22 includes a copy of the content of the storage area, the access control unit 11 performs a control operation so that the copy-destination storage area in the second storage device 22 is accessed. In contrast, if the second storage device 22 does not include a copy of the content of the storage area, the access control unit 11 performs a control operation so that the corresponding storage area in the first storage device 21 is accessed. In this way, the speed of the response to the access request is improved.

From unit storage areas each having a certain size in the first storage device 21, the extraction unit 12 extracts a storage area formed by consecutive unit storage areas as a monitored area at certain time intervals, the number of times of access to any one of the consecutive unit storage areas being a predetermined number, which is more than 0, and being similar to the number of times of access to any one of the other consecutive unit storage areas. The number of times of access to any one of the consecutive unit storage areas being similar to the number of times of access to any one of the other consecutive unit storage areas signifies a case when the difference between the number of times of access to any one of the unit storage areas and the number of times of access to any one of the other unit storage areas falls within a certain range.

Among the monitored areas extracted by the extraction unit 12, when the prediction unit 13 detects movement between the positions of same-sized monitored areas in the first storage device 21 over time, the prediction unit 13 determines a predicted storage area predicted to be accessed in the storage areas in the first storage device 21 on the basis of the direction of the movement between the positions of the same-sized monitored areas. Next, the prediction unit 13 performs a control operation so that the content of the predicted storage area determined is copied to the second storage device 22.

Through the processing performed by the extraction unit 12 and the prediction unit 13, a predicted storage area predicted to be accessed subsequently by the host apparatus 23 is accurately determined. In addition, since the content of the predicted storage area determined in this way is copied to the second storage device 22 before access to the storage area is requested subsequently, the access speed when access to the storage area is requested is increased. Thus, as a whole, the speed of the control device 10 in responding to access requests is improved.

Next, specific examples of the processing performed by the extraction unit 12 and the prediction unit 13 will be described with reference to the bottom-left portion in FIG. 1. The bottom-left portion in FIG. 1 illustrates movement between the positions of accessed storage areas over time, among the storage areas in the first storage device 21.

Time "t," "t+1," and "t+2" represent continuous time periods each having a certain length. In addition, unit storage areas A1 to A6 are arranged consecutively in the first storage device 21.

Assuming that, in the time period represented by time "t," each of the numbers of times of access to the neighboring unit storage areas A1 and A2 satisfies a predetermined number, which is 1 or more, and that these numbers are similar to each other, the extraction unit 12 determines a storage area 21*a* formed by combining these unit storage areas A1 and A2 to be a monitored area. Hereinafter, "the number of times of access to a storage area" will be referred to as "the access number of a storage area," as needed.

In addition, assuming that, in the next time period represented by time "t+1," each of the access numbers of the neighboring unit storage areas A3 and A4 satisfies a predetermined number, which is 1 or more, and that these numbers are similar to each other, the extraction unit 12 determines a storage area 21*b* formed by combining these unit storage areas A3 and A4 to be a monitored area.

In FIG. 1, the storage areas 21*a* and 21*b*, which are determined to be monitored areas in the respective time periods, have the same size and are arranged at different locations in the first storage device 21. Thus, the prediction unit 13 determines movement between the positions of the monitored areas over time. Namely, the prediction unit 13 determines that the storage area 21*a* is the previous monitored area and the storage area 21*b* is the most-recent monitored area.

The prediction unit 13 determines a predicted storage area on the basis of the direction of the movement between the positions of the monitored areas. The predicted storage area is a storage area that is predicted to be accessed subsequently. In the example in FIG. 1, between time "t" and time "t+1," the monitored area has moved by two unit storage areas in the direction of a larger address number. Thus, the prediction unit 13 predicts that accesses from the host apparatus 23 will be concentrated on a storage area 21*c* formed by combining the unit storage areas A5 and A6 in the next time period represented by time "t+2." Namely, the prediction unit 13 determines the storage area 21*c* to be a predicted storage area. The prediction unit 13 performs a control operation so that the content of the storage area 21*c* is copied to the second storage device 22.

Through the above processing, in the monitored area determined by the prediction unit 13, the corresponding storage areas are evenly accessed in a certain time period. If such monitored area moves over time, it is determined that macroscopically sequential access is being performed. For example, such access tendency is seen when the host apparatus 23 executes a single application.

As described above, when movement between the positions of monitored areas is detected, a predicted storage area is determined on the basis of the direction of the movement. Namely, a storage area that is predicted to be accessed subsequently by the host apparatus 23 is accurately determined. In addition, since the content of the predicted storage area determined is copied to the second storage device 22 before access to the storage area is requested subsequently, the probability that the content of the target storage area has already been copied to the second storage device 22 is increased. As a result, the speed of the control device 10 in responding to access requests is improved.

Second Embodiment

Next, an example in which a storage apparatus 2 uses a plurality of HDDs as the first storage device and uses an SSD as the second storage device will be described.

Figure 2:
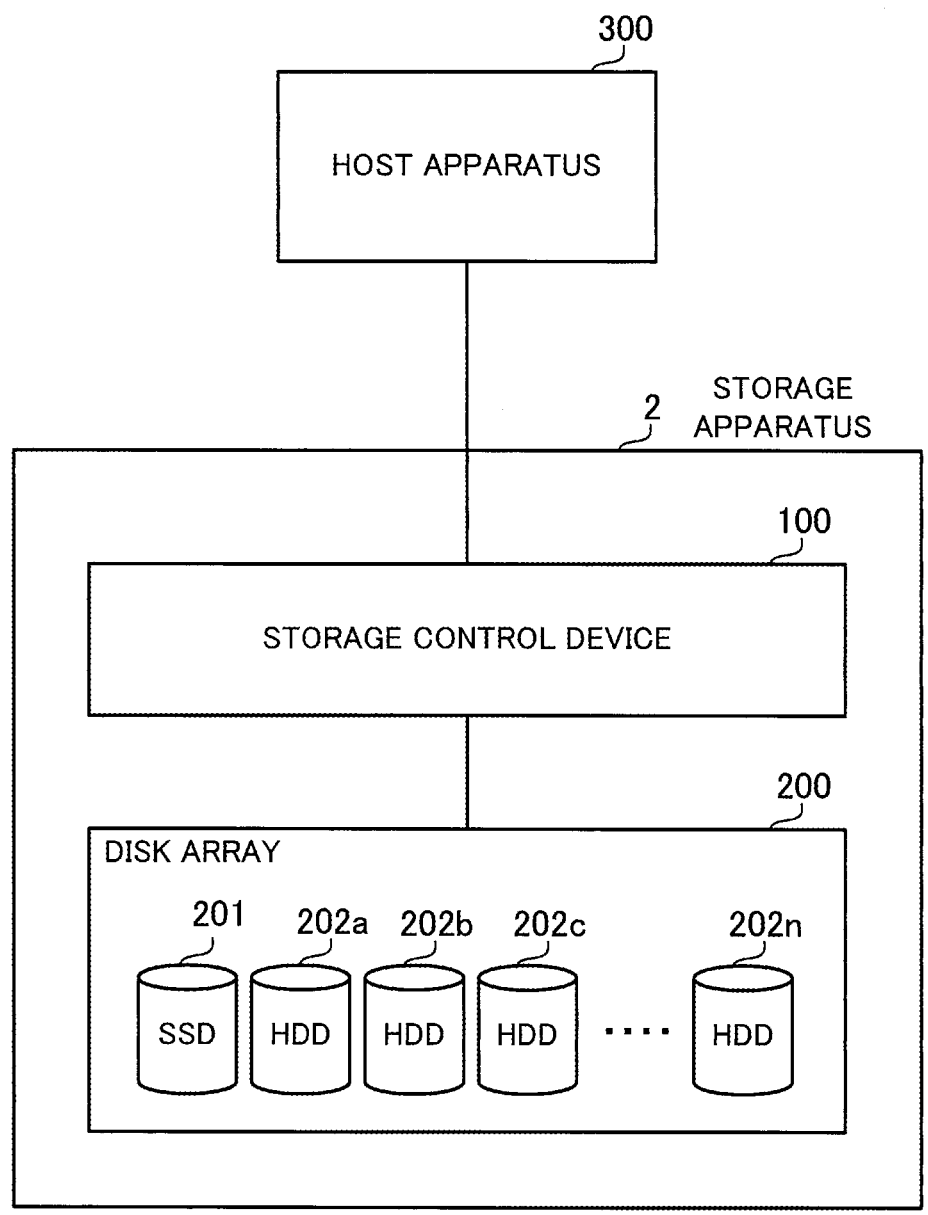
FIG. 2 illustrates an exemplary configuration of a storage system according to a second embodiment.

FIG. 2 illustrates an exemplary configuration of the storage apparatus 2 according to a second embodiment. The storage apparatus 2 illustrated in FIG. 2 includes a storage control device 100 and a disk array 200. The storage apparatus 2 is connected to a host apparatus 300.

The storage control device 100 controls access to the disk array 200. The disk array 200 includes an SSD 201 and HDDs 202a to 202n. The SSD 201 may be provided in plurality.

The storage control device 100 is an example of the control device 10 in the storage apparatus 1 according to the first embodiment. The SSD 201 is an example of the second storage device 22 in the storage apparatus 1 according to the first embodiment. The group of HDDs 202a to 202n is an example of the first storage device 21 in the storage apparatus 1 according to the first embodiment. The host apparatus 300 is an example of the host apparatus 23 in the storage system according to the first embodiment.

The HDDs 202a to 202n store data that may be accessed by the host apparatus 300. The SSD 201 is a storage device that may provide faster access than the HDDs 202a to 202n. The SSD 201 stores part of the data stored in the HDDs 202a to 202n under the control of the storage control device 100. In addition to the part of the data stored in the HDDs 202a to 202n, the SSD 201 may store programs and various types of other data such as applications used in the storage apparatus 2 and an operating system (OS).

The storage control device 100 issues a command to the SSD 201 or to a corresponding one of the HDDs 202a to 202n, in response to an access request from the host apparatus 300. In this way, the storage control device 100 controls access to these storage devices. In addition, the storage control device 100 manages physical storage areas realized by the HDDs 202a to 202n and controls access to these physical storage areas. For example, a technique using redundant arrays of inexpensive disks (RAID) may be used to manage the physical storage areas. However, other techniques may additionally or alternatively be used.

Among the storage areas in the HDDs 202a to 202n, the storage control device 100 predicts a storage area on which accesses (read requests and write requests) from the host apparatus 300 are likely to be concentrated in the near future and reads the content of the storage area. The storage control device 100 writes the read content in the SSD 201. Namely, the storage control device 100 copies the entire content of the storage area on which accesses are likely to be concentrated, to the SSD 201. Hereinafter, this series of operations from prediction of data to writing of the data in the SSD 201 will be referred to as "prefetch," as needed.

When the storage control device 100 receives a request for reading data stored in any one of the HDDs 202a to 202n from the host apparatus 300, if the requested data is stored in the SSD 201, the storage control device 100 reads the data from the SSD 201 instead of from the corresponding HDD.

In contrast, if the requested data is not stored in the SSD 201, the storage control device 100 reads the data from the corresponding HDD.

When the storage control device 100 receives a request for writing data in any one of the HDDs 202a to 202n from the host apparatus 300, if the content of the requested write-destination storage area has already been written in the SSD 201, the storage control device 100 writes the requested data in the corresponding storage area in the SSD 201 instead of in the corresponding HDD. In contrast, if the content of the write-destination storage area has not been written in the SSD 201, the storage control device 100 writes the requested data in the corresponding HDD.

Namely, when an access request directed to such prefetched data is transmitted from the host apparatus 300, data access processing in response to the access request from the host apparatus 300 is performed at higher speed. Thus, if the host apparatus 300 accesses more prefetched data, the performance of the storage apparatus 2 in responding to the access requests from the host apparatus 300 is increased further.

On the basis of a user operation, the host apparatus 300 transmits a request for access to a storage area realized by a corresponding one of the HDDs 202a to 202n to the storage control device 100. For example, on the basis of a user operation, the host apparatus 300 reads data from a corresponding one of the HDDs 202a to 202n via the storage control device 100. In addition, for example, on the basis of a user operation, the host apparatus 300 writes data in a corresponding one of the HDDs 202a to 202n via the storage control device 100.

Figure 3:
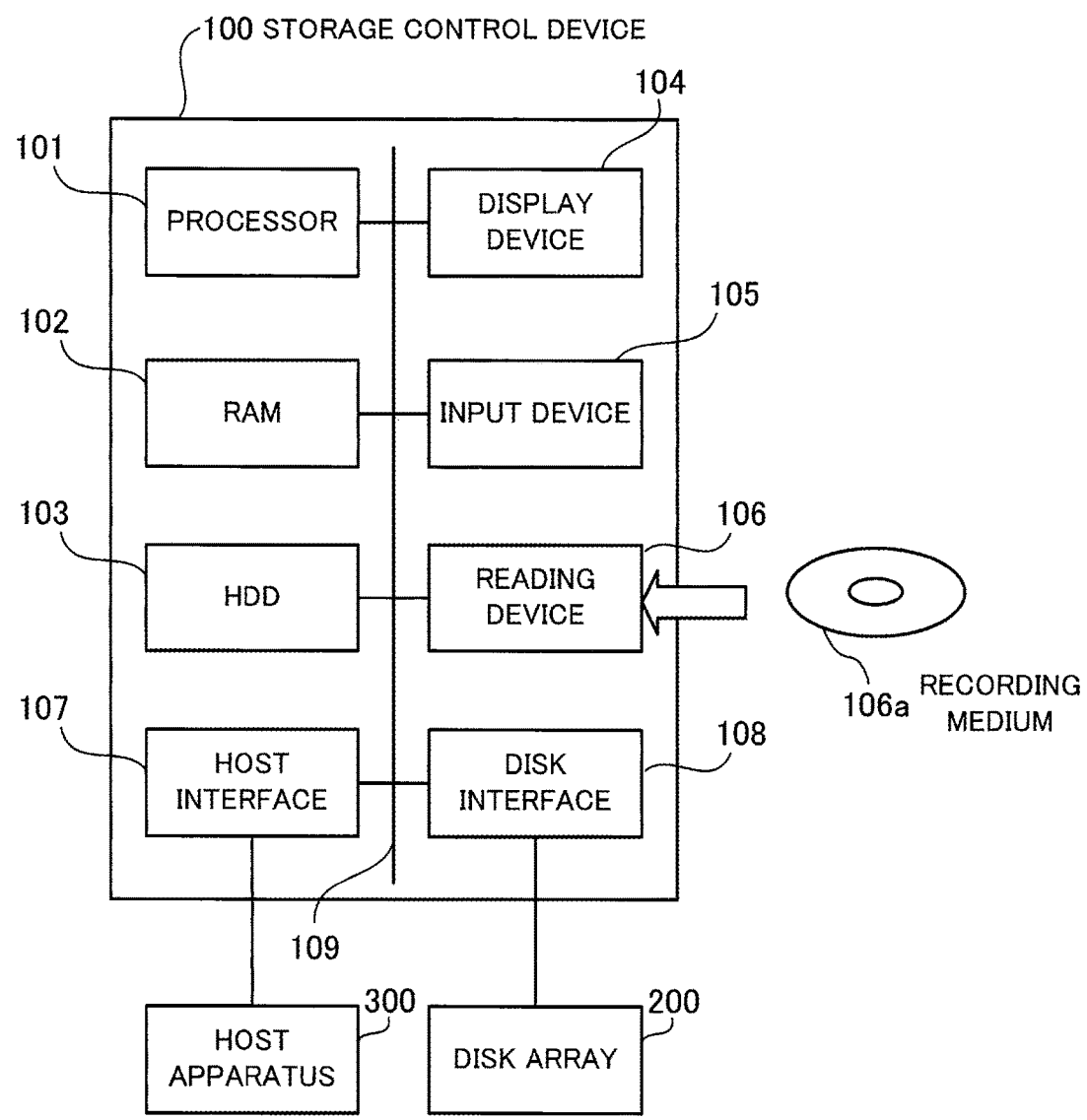
FIG. 3 illustrates an exemplary hardware configuration of a storage control device.

FIG. 3 illustrates an exemplary hardware configuration of a storage control device 100.

A processor 101 comprehensively controls the storage control device 100. The processor 101 is connected to a random access memory (RAM) 102 and a plurality of peripheral devices via a bus 109. The RAM 102 is used as a main storage device of the storage control device 100. At least a part of a program executed by the processor 101 and various types of data needed for processing by this program are temporarily stored in the RAM 102.

Examples of the peripheral devices connected to the processor 101 include a HDD 103, a display device 104, an input device 105, a reading device 106, a host interface 107, and a disk interface 108.

The HDD 103 is used as a secondary storage device of the storage control device 100. For example, a program executed by the processor 101 and various types of data needed for executing the program are stored in the HDD 103. For example, another kind of non-volatile storage device such as an SSD may be used as the secondary storage device.

The display device 104 causes a display of the storage control device 100 to display an image in accordance with an instruction from the processor 101. For example, a liquid crystal display (LCD) or an organic electro luminescence (EL) may be used as the display.

The input device 105 transmits an output signal, which is output in response to an input operation by the user of the storage control device 100, to the processor 101. Examples of the input device 105 include a touch pad and a keyboard.

The reading device 106 is a drive unit reading program or data recorded in a recording medium 106a. For example, a magnetic disk such as a flexible disk (FD) or an HDD, an optical disc such as a compact disc (CD) or a digital versatile disc (DVD), or a magneto-optical disk (MO) may be used as the recording medium 106a.

The host interface 107 performs interface processing for data exchange between the host apparatus 300 and the storage control device 100. The disk interface 108 performs interface processing for data exchange between the disk array 200 and the storage control device 100.

The storage control device 100 may be configured without the reading device 106. If the storage control device 100 is exclusively controlled by another terminal apparatus, the storage control device 100 may be configured without the display device 104 and the input device 105.

Figure 4:
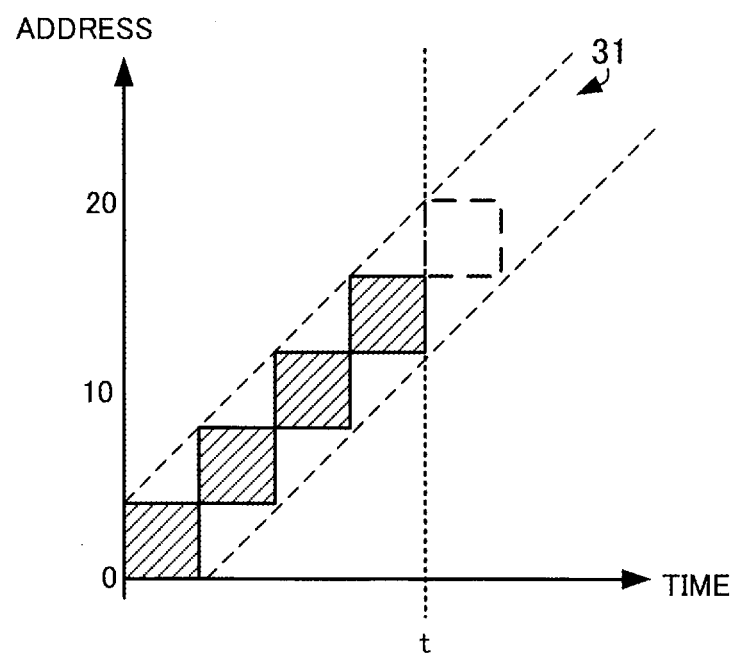
FIG. 4 illustrates an example of a sequential access pattern.
Figure 5:
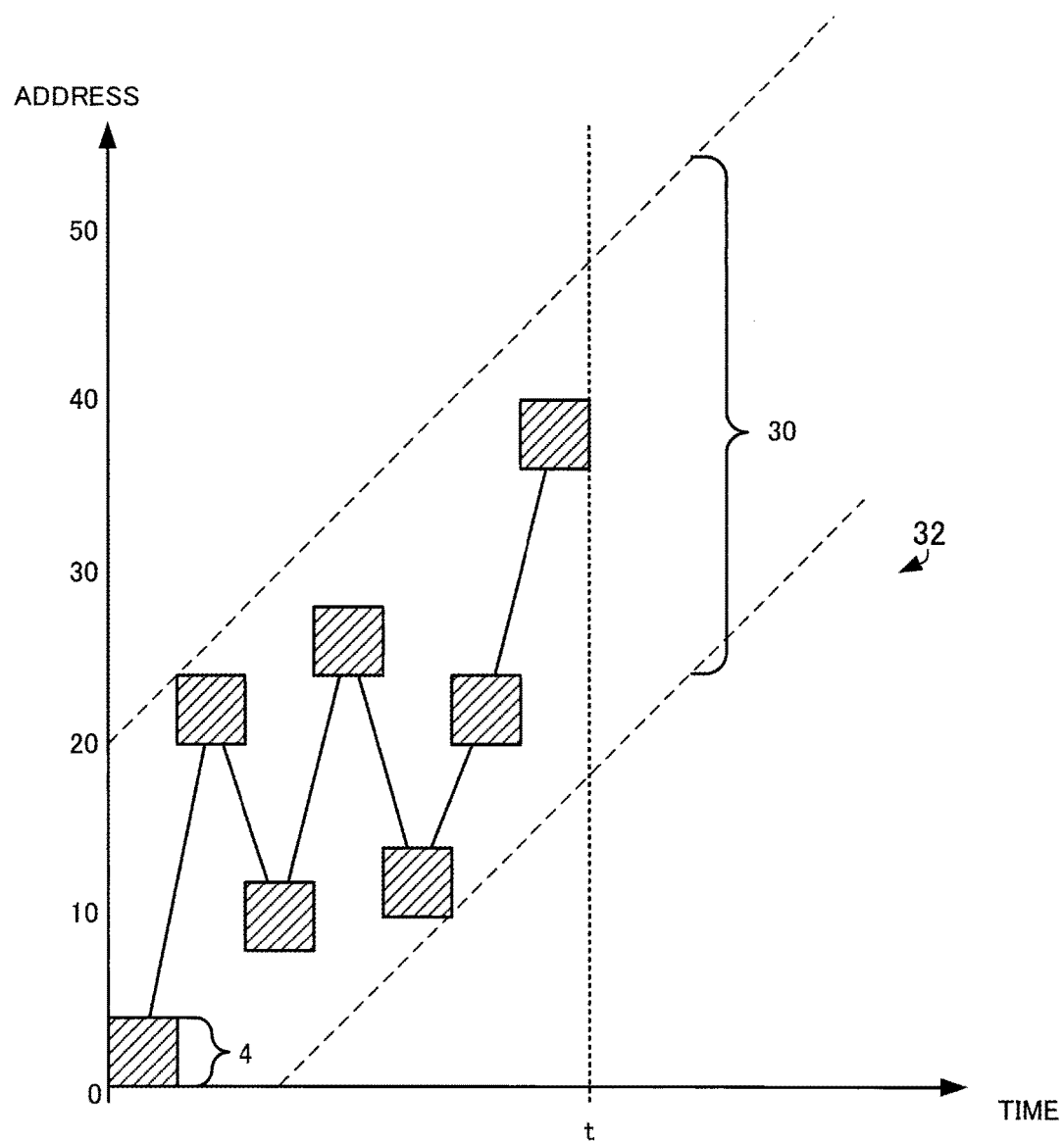
FIG. 5 illustrates an example of a macroscopically sequential access pattern.

When the storage control device 100 determines the tendency of access requests from the host apparatus 300, the storage control device 100 prefetches corresponding data on the basis of the tendency. Namely, the prefetched data is more likely to be accessed by the host apparatus 300. Each of FIGS. 4 and 5 illustrates examples of the tendency of access requests from the host apparatus 300. More specifically, FIG. 4 illustrates an example of a sequential access pattern and FIG. 5 illustrates an example of a macroscopically sequential access pattern.

In the description of FIGS. 4 and 5, any one of the HDDs 202a to 202n will simply be referred to as a "HDD 202" for convenience. In addition, when the HDDs 202a to 202n do not need to be distinguished from each other, any one of the HDDs 202a to 202n will simply be referred to as a "HDD 202." Namely, the HDD 202 signifies a storage device that realizes at least one storage area accessed by the host apparatus 300.

FIG. 4 illustrates an example of a sequential access pattern. A graph 31 represents a correspondence relationship between a group of storage areas in the HDD 202 that have been accessed by the host apparatus 300 and time when the corresponding access requests have been made. The vertical axis of the graph 31 represents addresses of the storage areas in the HDD 202. The horizontal axis of the graph 31 represents time when the access requests directed to the storage areas in the HDD 202 have been made. In the graph 31, the lower end of a rectangular area represents the start address of an accessed storage area in the HDD 202, and the upper end of a rectangular area represents the end address of an accessed storage area in the HDD 202.

Next, an example of the tendency of access requests transmitted from the host apparatus 300 to the storage control device 100 will be described with reference to the graph 31.

As illustrated in the graph 31, the host apparatus 300 has transmitted access requests directed to the following storage areas in the HDD 202 to the storage control device 100 in the following order: a storage area whose start and end addresses represent "0" and "3," respectively, a storage area whose start and end addresses represent "4" and "7," respectively, a storage area whose start and end addresses represent "8" and "11," respectively, and a storage area whose start and end addresses represent "12" and "15," respectively.

In this case, the storage control device 100 determines that the host apparatus 300 has transmitted sequential access requests to the storage control device 100 between time "0" and time "t." At time t, the storage control device 100 determines that the host apparatus 300 is likely to request access to a storage area whose start and end addresses represent "16" and "19" after time "t." Thus, at time "t" the storage control device 100 prefetches the storage area whose start and end addresses represent "16" and "19," respectively. In this way, the probability that the host apparatus 300 requests access to prefetched data is increased.

Thus, when the storage control device 100 determines occurrence of an access pattern indicating sequential reading (sequential access pattern), the storage control device 100 prefetches corresponding data on the basis of the access pattern. Consequently, the speed of the storage apparatus 2 in responding to access requests is increased.

FIG. 5 illustrates an example of a macroscopically sequential access pattern. As is the case with the graph 31 in FIG. 4, a graph 32 illustrates a correspondence relationship between a group of storage areas in the HDD 202 that have been accessed by the host apparatus 300 and time when the corresponding access requests have been made. Thus, redundant description will be omitted as needed.

Next, an example of the tendency of access requests transmitted from the host apparatus 300 to the storage control device 100 will be described with reference to the graph 32.

As illustrated in the graph 32, the host apparatus 300 has transmitted access requests directed to the following storage areas in the HDD 202 to the storage control device 100 in the following order: a storage area whose start and end addresses represent "0" and "3," respectively, a storage area whose start and end addresses represent "20" and "23," respectively, a storage area whose start and end addresses represent "8" and "11," respectively, a storage area whose start and end addresses represent "24" and "27," respectively, a storage area whose start and end addresses represent "10" and "13," respectively, a storage area whose start and end addresses represent "20" and "23," respectively, and a storage area whose start and end addresses represent "36" and "39," respectively. Namely, the storage control device 100 does not determine sequential access requests from the host apparatus 300 to the storage control device 100 between time "0" and time "t."

However, there are cases where a certain size of a storage area on which accesses from the host apparatus 300 are concentrated moves sequentially over time. For example, in the case of the graph 32, accesses from the host apparatus 300 are concentrated on a group of storage areas within a storage area size "30" within a certain time period, and there is a tendency that the target storage area moves sequentially over time. Hereinafter, an access pattern indicating such access tendency will be referred to as a "macroscopically sequential access pattern," as needed.

In FIG. 5, the storage control device 100 determines that accesses from the host apparatus 300 are likely to be concentrated on a storage area whose start and end addresses represent "20" and "50," respectively, after time "t." Thus, at time "t" the storage control device 100 prefetches corresponding data in the storage area whose start and end addresses represent "20" and "50," respectively. In this way, the probability that the host apparatus 300 requests access to prefetched data is increased.

Thus, when the storage control device 100 determines occurrence of a macroscopically sequential access pattern, the storage control device 100 prefetches corresponding data on the basis of the access pattern. Consequently, the performance of the storage apparatus 2 in responding to access requests from the host apparatus 300 is increased. However, unlike a normal sequential access pattern as illustrated in FIG. 4, such a macroscopically sequential access pattern is not easily determined from the history of actually accessed storage areas.

Hereinafter, functions of the storage control device 100 for determining occurrence of a macroscopically sequential access pattern and for prefetching corresponding data on the basis of the access pattern will be described with reference to FIG. 6, etc.

Figure 6:
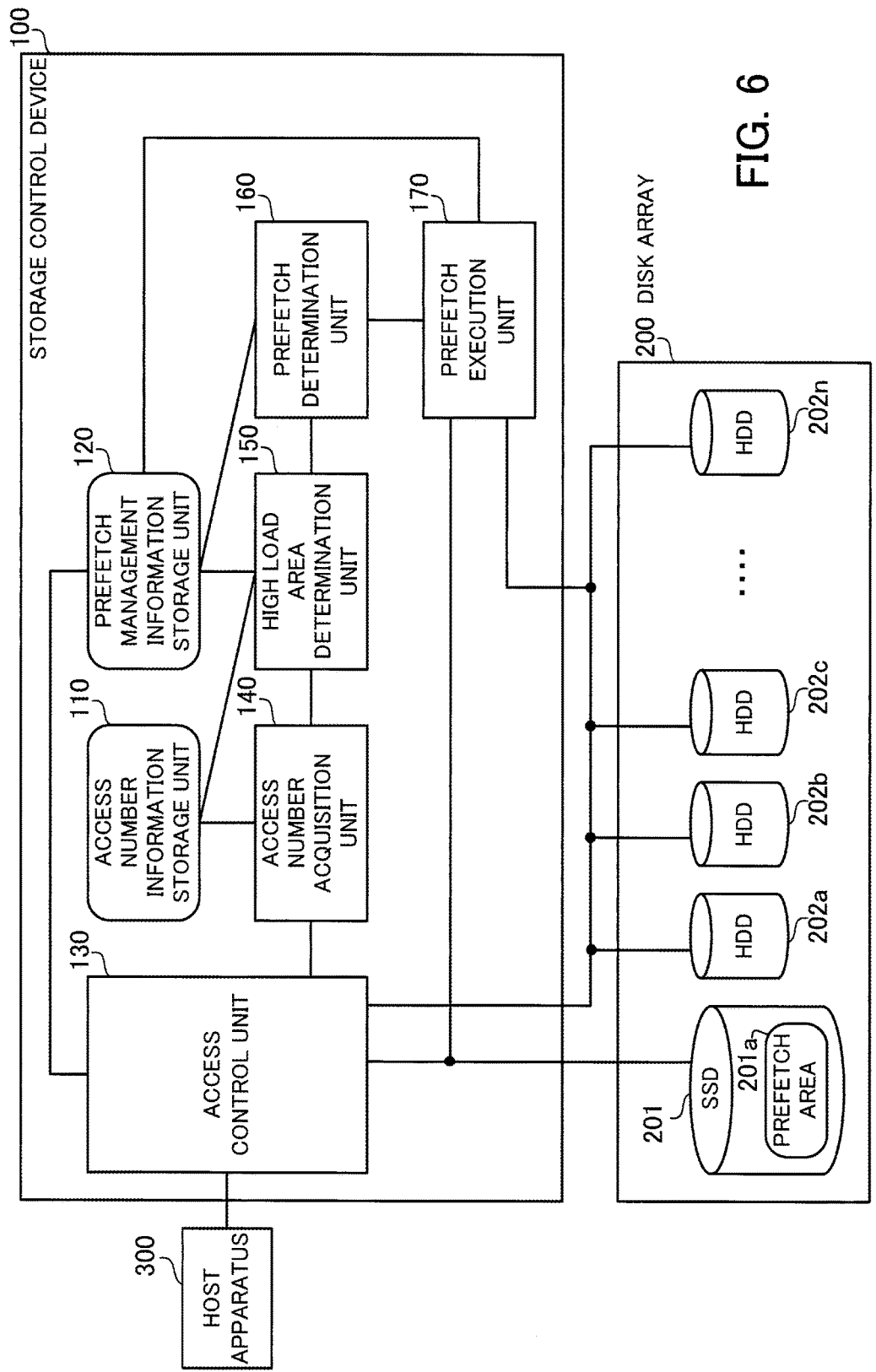
FIG. 6 is a block diagram illustrating an exemplary configuration of functions of the storage control device.

FIG. 6 is a block diagram illustrating an exemplary configuration of functions of the storage control device 100. The descriptions of the same components between FIGS. 2 and 6 will be omitted as needed.

The storage control device 100 includes an access number information storage unit 110, a prefetch management information storage unit 120, an access control unit 130, an access number acquisition unit 140, a high load area determination unit 150, a prefetch determination unit 160, and a prefetch execution unit 170. The SSD 201 includes a prefetch area 201a.

Each of the access number information storage unit 110 and the prefetch management information storage unit 120 may be realized as a storage area in the RAM 102 or the HDD 103. For example, processing by the access control unit 130, the access number acquisition unit 140, the high load area determination unit 150, the prefetch determination unit 160, and the prefetch execution unit 170 may be realized by causing the processor 101 to execute a predetermined program.

The access control unit 130 is an example of the access control unit 11 according to the first embodiment. In addition, the high load area determination unit 150 is an example of the extraction unit 12 according to the first embodiment. In addition, the prefetch determination unit 160 and the prefetch execution unit 170 are examples of the prediction unit 13 according to the first embodiment.

The access number information storage unit 110 stores an access number information table in which an access number per unit segment within a certain time period is temporarily stored. The storage area in an HDD in the disk array 200 is divided into a plurality of segments of a certain size, and each of the segments will be referred to as a "unit segment."

The prefetch management information storage unit 120 stores a high load area information table in which information about high load areas is stored. A "high load area" includes storage areas, each of which has been accessed by the host apparatus 300 a predetermined number of times (a threshold) or more per unit time, the access numbers of the storage areas being approximately the same. In addition, the prefetch management information storage unit 120 stores a prefetch management table in which information about prefetch target storage areas is temporarily stored.

On the basis of an access request from the host apparatus 300, the access control unit 130 accesses data in a corresponding one of the HDDs in the disk array 200. The access control unit 130 uses the prefetch management table and uses a partial storage area in the SSD 201 as the prefetch area 201a when controlling access to the HDD in the disk array 200.

Namely, when receiving a read request from the host apparatus 300, the access control unit 130 refers to the prefetch management table and determines whether the corresponding data requested to be read is stored in the prefetch area 201a. If the data is stored in the prefetch area 201a, the access control unit 130 reads the data from the prefetch area 201a and transmits the data to the host apparatus 300. However, if the data is not stored in the prefetch area 201a, the access control unit 130 reads the data from the corresponding HDD and transmits the data to the host apparatus 300.

When receiving a write request from the host apparatus 300, the access control unit 130 refers to the prefetch management table and determines whether the content of the corresponding write-destination storage area is stored in the prefetch area 201a. If the content of the write-destination storage area is stored in the prefetch area 201a, the access control unit 130 writes the data requested to be written in the corresponding storage area in the prefetch area 201a and transmits a reply in response to the write request to the host apparatus 300. However, if the content of the write-destination storage area is not stored in the prefetch area 201a, the access control unit 130 writes the data requested to be written in the corresponding HDD, not in the prefetch area 201a, and transmits a reply in response to the write request to the host apparatus 300.

In addition, the access control unit 130 manages the prefetch area 201a by using the prefetch management table. In the second embodiment, the access control unit 130 refers to the prefetch management table to determine a storage area in the prefetch area 201a that has not been used for a certain time period. Next, the access control unit 130 deletes data in the determined storage area from the prefetch area 201a. If the determined storage area in the prefetch area 201a includes data that has been updated on the basis of a write request from the host apparatus 300, the access control unit 130 writes the data in a corresponding HDD storage area in the disk array 200. In this way, the consistency between the data that has not been updated in the HDD and the data that has been updated in the prefetch area 201a is maintained.

Among the data stored in the prefetch area 201a, the data that has been updated on the basis of the write request from the host apparatus 300 may be written in the corresponding HDD storage area at other timing.

The access number acquisition unit 140 monitors the number of access requests transmitted from the host apparatus 300 within a certain time period per unit segment. The access number acquisition unit 140 performs this monitoring every certain time period. Next, the access number acquisition unit 140 temporarily stores information about the monitored access numbers in the access number information table.

The high load area determination unit 150 determines, at certain time intervals, at least one high load area on the basis of the access number of each segment registered in the access number information table and registers information about the determined high load area in the high load area information table.

The prefetch determination unit 160 monitors movement between the positions of the registered high load areas over time at certain time intervals. More specifically, from the registered high load areas, the prefetch determination unit 160 extracts high load areas, the access numbers thereof in a certain time period being similar and the storage area sizes thereof being the same. Next, by determining the positional relationship between the start addresses of the high load areas, the prefetch determination unit 160 monitors movement between the positions of the high load areas over time. The prefetch determination unit 160 determines occurrence of a macroscopically sequential access pattern on the basis of the movement between the positions of the monitored high load areas over time.

If movement between the positions of the high load areas, the access numbers thereof in a certain time period being similar and the storage area sizes thereof being the same, has been detected over time, the prefetch execution unit 170 determines that the movement between the positions of the high load areas corresponds to a macroscopically sequential access pattern. In such case, the prefetch execution unit 170 calculates prefetch information on the basis of the movement between the positions of the monitored high load areas over time. The prefetch information includes the start address at which prefetch is started, the size of the entire storage area from which data is to be prefetched (total prefetch size), and the speed at which the data is prefetched (prefetch speed).

Next, on the basis of the calculated prefetch information, the prefetch execution unit 170 prefetches relevant data from the corresponding HDD in the disk array 200 to the prefetch area 201a at certain time intervals. The prefetch execution unit 170 registers information about the storage area including the prefetched data in the prefetch management table.

The content prefetched by the prefetch execution unit 170 from any one of the HDD storage areas in the disk array 200 is temporarily stored in the prefetch area 201a.

Next, tables used by the storage apparatus 2 will be described with reference to FIGS. 7 to 9.

Figure 7:
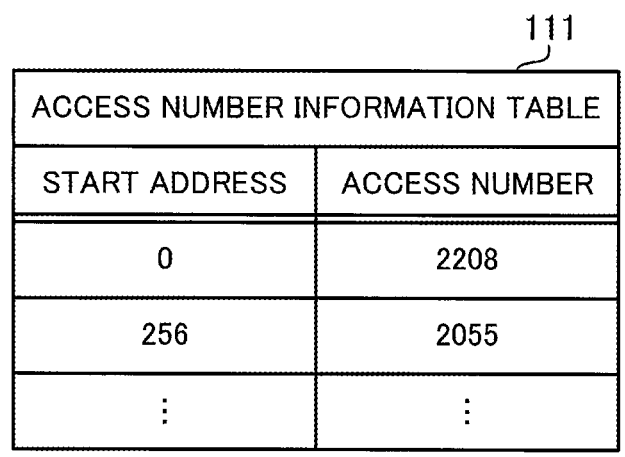
FIG. 7 illustrates an exemplary access number information table.

FIG. 7 illustrates an example of an access number information table 111. The access number information table 111 temporarily stores information about an access number per unit segment within a certain time period. The access number information table 111 is stored in the access number information storage unit 110. The content of the access number information table 111 is updated at certain time intervals. The access number information table 111 includes columns for "Start address" and "Access number."

In an entry under "Start address," information about the start address of a unit segment in an HDD in the disk array 200 is set. In the example in the FIG. 7, the size of each unit segment is "256 MB."

In an entry under "Access number," information about the number of accesses to a unit segment within a certain time period is set. The following description will be made assuming the access number is detected every minute. In such case, the access number information table 111 is updated every minute.

FIG. 8 illustrates an example of a high load area information table 121. The high load area information table 121 stores information about high load areas. The high load area information table 121 is stored in the prefetch management information storage unit 120. The high load area information table 121 includes columns for "Detected time," "Start address," "Area size," "Average access number," and "Duration time."

In an entry under "Detected time," information about time at which a high load area has been detected is set. Time set in an entry under "Detected time" identifies the time period at which a high load area has been detected, and this time period matches the time period during which the access number used for detecting the corresponding high load area has been detected.

In an entry under "Start address," information about the start address of a high load area is set. In an entry under "Area size," information about the size of a high load area is set. In an entry under "Average access number," information about the average of the access numbers of the unit segments included in a high load area is set.

From among the high load areas detected during different time periods, the prefetch determination unit 160 determines high load areas whose access numbers are similar to each other and which have approximately the same storage area size to be corresponding high load areas and monitors the positions of the high load areas. The prefetch determination unit 160 continues monitoring the corresponding high load areas until movement between the positions (namely, the start addresses of the high load areas) is detected. In an entry under "Duration time," information about time for which monitoring of the position of a high load area has been continued is set. In addition, time intervals at which a high load area is detected is set as the initial value of the duration time. For example, when the high load area is detected every minute, "1" is set as the initial value of the duration time as illustrated in FIG. 8.

In the example of the high load area information table 121 in FIG. 8, the prefetch determination unit 160 determines a high load area, which has been detected at detected time "t1," whose area size is "768 MB", and whose average access number is "4562" and a high load area, which has been detected at the next detected time "t+1," whose area size is "768 MB," and whose average access number is "4522," to be corresponding high load areas and monitors the positions. Assuming that the high load area whose area size is "768 MB" has been detected at detected time "t1" for the first time, the duration time of the former one of the high load areas is set to "1" and the duration time of the latter high load area is set to "2."

FIG. 9 illustrates an example of a prefetch management table 122. The prefetch management table 122 temporarily stores information about prefetch target storage areas. The prefetch management table 122 is stored in the prefetch management information storage unit 120. The prefetch management table 122 is used when data is accessed in response to an access request from the host apparatus 300. The prefetch management table 122 includes columns for "Read source address," "Write destination address," "Area size," and "Prefetched time."

In entry under "Read source address," information about the start address of a prefetch target storage area in an HDD in the disk array 200 is set. In an entry under "Write destination address," information about the start address of a write-destination storage area having a prefetched content in the prefetch area 201a is set. In an entry under "Area size," information about the size of a prefetch target storage area is set. In an entry under "Prefetched time," information about time at which data is prefetched is set.

Instead of or in addition to the column "Prefetched time," the prefetch management table 122 may include a column for setting information about the access number of a read source address.

Next, an example of detection of a high load area by the high load area determination unit 150 will be described with reference to FIGS. 10 and 11. In accordance with a method described with reference to FIGS. 10 and 11, the high load area determination unit 150 determines storage areas, whose access numbers are equal to or more than a threshold and are similar to each other, to be a high load area.

FIG. 10 illustrates an exemplary operation of detecting high load areas. A histogram 112 illustrates an access number per unit time and per unit segment in an HDD in the disk array 200. The vertical axis of the histogram 112 represents the access number and the horizontal axis of the histogram 112 represents unit segments in an HDD in the disk array 200.

An example where the access numbers of unit segments R1 to R6 in an HDD in the disk array 200 are "1750," "1800," "500," "600," "450," and "2750," respectively, during a certain time period as illustrated in the top histogram 112 in FIG. 10 will be described.

In such case, first, the high load area determination unit 150 extracts unit segments whose access numbers are equal to or more than a threshold. A value larger than "0" is used as the threshold. In FIG. 10, when the threshold is set to "1500," the high load area determination unit 150 extracts unit segments R1, R2, and R6 as illustrated in the bottom histogram 112 in FIG. 10.

FIG. 11 illustrates an exemplary operation that follows the operation illustrated in FIG. 10.

Next, among the unit segments, which have been extracted in accordance with the method described with reference to FIG. 10 and whose access numbers are equal to or more than the threshold, the high load area determination unit 150 combines unit segments whose access numbers are similar to each other and which are adjacent to each other. While two unit segments are combined with each other in the example in FIG. 11, three or more adjacent unit segments may be combined with each other.

As illustrated in the top histogram 112 in FIG. 11, the unit segments R1 and R2 are such unit segments that are adjacent to each other among the extracted unit segments R1, R2, and R6. In addition, for example, whether the access numbers are similar to each other is determined by whether the difference between the maximum value and the minimum value of the access numbers of the processed unit segments is equal to or less than a predetermined rate of the maximum value (or the minimum value) (for example, 10%). Since the unit segments R1 and R2 satisfy this condition, the high load area determination unit 150 combines the unit segments R1 and R2 among the unit segments R1, R2, and R6, as illustrated in the bottom histogram 112 in FIG. 11. After the unit segments are combined, the access number of the combined segments is the average of the access numbers of the unit segments before the unit segments are combined.

The high load area determination unit 150 determines two segments as illustrated in the bottom histogram 112 in FIG. 11 to be a high load area and registers information about the determined high load area in the high load area information table 121.

As described with reference to FIGS. 10 and 11, the high load area determination unit 150 detects a high load area having storage areas whose access numbers are equal to or more than the threshold and are similar to each other among the unit segments in an HDD in the disk array 200. Next, by causing the prefetch determination unit 160 to monitor movement between the positions of the acquired high load areas over time, whether a macroscopically sequential access pattern has occurred is determined.

A macroscopically sequential access pattern is likely to occur when the host apparatus 300 executes a single application. In addition, storage areas to which access requests have been transmitted by a single application are likely to be accessed approximately evenly. Thus, by monitoring movement between the positions of the storage areas accessed approximately evenly over time, occurrence of a macroscopically sequential access pattern is accurately determined.

In contrast, it is likely that significantly differently accessed storage areas are those that have been accessed by different applications. For example, an application transmits sequential access requests to a portion of a certain storage area and another application simultaneously temporarily transmits many access requests, the portion of the storage area is accessed significantly differently. Thus, it is not fair to say that the storage area has been accessed evenly. Namely, it is not fair to say that access requests transmitted to such storage area has a certain tendency that contributes to improvement of prefetch accuracy.

As described with reference to FIG. 11, the high load area determination unit 150 combines adjacent unit segments, the difference between the access numbers of the unit segments being similar, and determines the combined storage areas to be a high load area. In this way, it is possible to detect evenly accessed storage areas as monitoring target storage areas of the prefetch determination unit 160. Thus, occurrence of a macroscopically sequential access pattern is accurately determined.

In addition, as described with reference to FIG. 10, the high load area determination unit 150 detects unit segments whose access numbers are equal to or more than a threshold as a possible high load area. In this way, storage areas on which accesses from the host apparatus 300 have been concentrated are extracted, and as a result, occurrence of a macroscopically sequential access pattern is accurately determined.

In addition, by only using such storage areas whose access numbers are equal to or more than a threshold as a high load area, the processor 101's load required for monitoring movement between the positions of the high load areas is reduced, and the storage areas in a storage device such as the RAM 102 or the HDD 103 for managing high load areas are saved.

Next, an example in which the prefetch determination unit 160 determines whether to prefetch data will be described with reference to FIG. 12. The prefetch determination unit 160 monitors movement between the positions of the high load areas detected by the high load area determination unit 150 over time in accordance with a method described with reference to FIG. 12. By determining whether the movement corresponds to a macroscopically sequential access pattern, the prefetch determination unit 160 determines whether to prefetch data.

Figure 12:
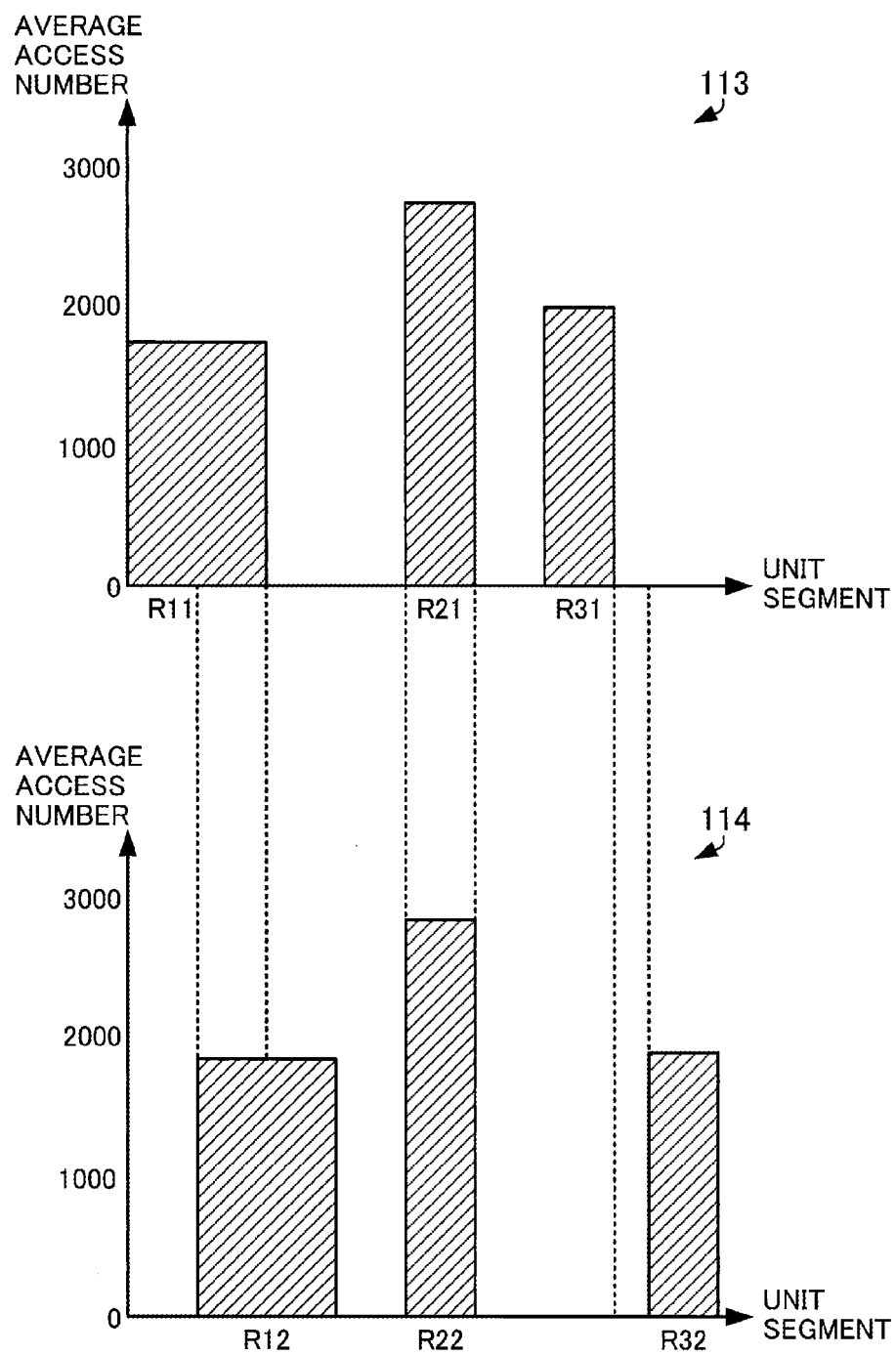
FIG. 12 illustrates an exemplary operation of determining whether to prefetch data.

FIG. 12 illustrates an exemplary operation of determining whether to prefetch data. Histograms 113 and 114 represent an average access number per detected high load area. The vertical axis of each of the histograms 113 and 114 represents an average access number per unit segment included in each high load area, and the horizontal axis of each of the histograms 113 and 114 represents a size per detected high load area.

The histogram 113 illustrates that high load areas R11, R21, and R31 whose average access numbers are "1750," "2750," and "2000," respectively, have been detected.

The histogram 114 illustrates that high load areas R12, R22, and R32 whose average access numbers are "1800," "2800," "1950," respectively, have been detected.

In FIG. 12, the high load areas illustrated in the histogram 113 have been detected at time "t," and the high load areas illustrated in the histogram 114 have been detected next at time "t+1" immediately after time "t."

In such case, first, from the previously detected high load areas, the prefetch determination unit 160 extracts a previous high load area having the same area size and approximately the same average access number as those of a most-recently detected high load area as a corresponding high load area. For example, whether the average access numbers are approximately the same is determined by whether the difference between the average access numbers is equal to or less than a predetermined rate of one of the average access numbers (for example, the average access number at the previous time) (for example, 10%).

As illustrated in FIG. 12, the average access numbers of the high load areas R11 and 12 are approximately the same, and the high load areas R11 and 12 have the same size. Thus, as a high load area corresponding to the high load area R12 detected at the previous time "t+1," the prefetch determination unit 160 extracts the high load area R11 from the high load areas detected at the time "t."

In addition, as illustrated in FIG. 12, the average access numbers of the high load areas R21 and R22 are approximately the same, and the high load areas R21 and R22 have the same size. Thus, as a high load area corresponding to the high load area R22 detected at the previous time "t+1," the prefetch determination unit 160 extracts the high load area R21 from the high load areas detected at the time "t."

In addition, as illustrated in FIG. 12, the average access numbers of the high load areas R31 and R32 are approximately the same, and the high load areas R31 and R32 have the same size. Thus, as a high load area corresponding to the high load area R32 detected at the previous time "t+1," the prefetch determination unit 160 extracts the high load area R31 from the high load areas detected at the time "t."

Next, the prefetch determination unit 160 determines movement between extracted high load areas as follows, on the basis of the positional relationship between the extracted high load areas and the most-recently detected high load areas.

The high load areas R11 and R12 have an overlapping area. In such case, the prefetch determination unit 160 determines that the high load area has moved from the high load area R11 to the high load area R12 between time "t" and time "t+1." Thus, the prefetch determination unit 160 determines that access to the high load areas R11 and R12 corresponds to a macroscopically sequential access pattern. In addition, in such case, the prefetch determination unit 160 ends monitoring movement of the position of the high load area R11 and starts monitoring movement of the position of the high load area R12.

While not illustrated, when an extracted high load area and a most-recently detected high load area are adjacent to each other, the prefetch determination unit 160 also determines that access to these high load areas corresponds to a macroscopically sequential access pattern.

In addition, the high load areas R21 and R22 are located at the same storage area. In such case, the prefetch determination unit 160 determines that the high load area has not moved from the high load area R21 to the high load area R22 between time "t" and time "t+1." Thus, the prefetch determination unit 160 determines that access to the high load area R22 could correspond to a macroscopically sequential access pattern in the future and continues to monitor movement of the position of the high load area R22.

In addition, the high load area R31 does not overlap or neighbor the high load area R32. In such case, the prefetch determination unit 160 ends monitoring movement of the position of the high load area R31 and starts monitoring movement of the position of the high load area R32.

In this way, on the basis of movement of the position of high load areas having the same area size and approximately the same average access number over time, the prefetch determination unit 160 determines whether a macroscopically sequential access pattern has occurred.

Next, an example where the prefetch execution unit 170 calculates prefetch information will be described with reference to FIG. 13. On the basis of movement between the positions of the high load areas monitored by the prefetch determination unit 160 over time, the prefetch execution unit 170 acquires a prefetch target storage area in an HDD in the disk array 200 and calculates the prefetch speed. In FIG. 13, a high load area is detected at certain time intervals, more specifically, every "1" minute. In addition, data is prefetched at the same time intervals.

FIG. 13 illustrates an exemplary method of prefetching data. The top portion in FIG. 13 illustrates a corresponding relationship between time at which a high load area is detected and a high load area or a prefetch target storage area.

A high load area 161a is a high load area detected at time "t." The start address of the high load area 161a is "0," and the size of the high load area 161a is "512 MB." A high load area 161b is a high load area detected at time "t+1." As is the case with the high load area 161a, the start address of the high load area 161b is "0," and the size of the high load area 161b is "512 MB." A high load area 161c is a high load area detected at time "t+2." The start address of the high load area 161c is "512," and the size of the high load area 161c is "512 MB."

The following description will be made assuming that the average access numbers of the respective high load areas 161a to 161c have been determined to be approximately the same and that the high load areas 161b and 161c are adjacent to each other as illustrated in the top portion in FIG. 13. Thus, the prefetch determination unit 160 determines that access to the high load areas 161a to 161c corresponds to a macroscopically sequential access pattern.

In this case, the prefetch execution unit 170 predicts that accesses from the host apparatus 300 will be concentrated on a storage area 161d whose start address is "512" and size is "512 MB" at time "t+3." In addition, the prefetch execution unit 170 predicts that accesses from the host apparatus 300 will be concentrated on a storage area 161e whose start address is "1024" and size is "512 MB" at time "t+4."

In this case, the prefetch execution unit 170 prefetches data from the storage area 161e, which is predicated as the next high load area.

During the time period corresponding to time "t+3," it is not likely that accesses will be concentrated on the storage area 161e. Thus, the content of the storage area 161e does not need to be stored in the prefetch area 201a immediately. It is only necessary that the content is stored in the prefetch area 201a by the start of the time period corresponding to time "t+4." Thus, the prefetch execution unit 170 transfers the content of the storage area 161e from the corresponding HDD to the prefetch area 201a at the transfer speed in accordance with the speed of the movement of the corresponding high load area.

More specifically, the prefetch execution unit 170 calculates the speed at which data is transferred during prefetching, by using the following mathematical expression "(size of prefetch target area)/{(time needed for movement of high load area)−(unit time of detection of high load area)}." The "time needed for movement of high load area" is equal to the value of the duration time registered in the high load area information table 121 in association with a corresponding previous high load area when movement of the high load area is detected. The "unit time of detection of high load area" is equal to the unit time for detecting the access number. In this example, "1 minute" is set.

In addition, the denominator of the above expression represents time from the current time to the start time of the time period when the position of the high load area is predicted to move next. Namely, the above mathematical expression is for calculating the data transfer speed so that the entire content of the prefetch target area is prefetched by the start of the time period when the position of the high load area is predicted to move next.

However, there are cases where the "time needed for movement of high load area" and the "unit time of detection of high load area" in the denominator of the above mathematical expression are the same value. In such cases, it is desirable that the content of the prefetch target area be transferred to the prefetch area 201a as quickly as possible. Thus, the prefetch execution unit 170 performs data transfer at the upper limit of the transfer speed, for example.

In the example in FIG. 13, the size of the prefetch target area is "512 MB," which is the size of the storage area 161e, and the time needed for movement of the high load area is "2 minutes" ((t+2)−t=2). Thus, the data transfer speed during prefetching is calculated as "512/(120−60)=8.5 [MB/second]."

At the start time of the time period corresponding to time "t+3," the prefetch execution unit 170 starts to transfer (copy) the content of the prefetch target area to the prefetch area 201a at the calculated transfer speed. For example, the prefetch execution unit 170 divides the prefetch target area into a plurality of storage areas each having the same size. Next, the contents of the divided storage areas are transferred separately at time intervals by the start time of the time period when the position of the high load area is predicted to move next, namely, within the time length indicated by the denominator of the above mathematical expression. In this way, the content of the prefetch target area is transferred to the prefetch area 201a at the transfer speed calculated by the above mathematical expression.

In the example in the bottom portion in FIG. 13, the prefetch target area is divided into four divided areas 162a to 162d. Next, at the start time of the time period corresponding to time "t+3," the prefetch execution unit 170 starts to issue read request commands so that the contents of the divided areas 162a to 162d are read at regular intervals within one minute.

The storage control device 100 accesses to HDDs in response to requests from the host apparatus 300 even during the prefetch period. By prefetching data at a transfer speed in accordance with the movement speed of the high load area as described above, the possibility that the access load on the corresponding HDD is increased more than necessary is reduced. As a result, processing for prefetch access less affects processing for access to HDDs in response to requests from the host apparatus 300. Therefore, the performance in responding to requests from the host apparatus 300 is not decreased.

When the "time needed for movement of high load area" and the "unit time of detection of high load area" in the above mathematical expression for calculating the data transfer speed during prefetching are the same value, the prefetch execution unit 170 transfers the data in the prefetch target area at once by issuing only one read request command, for example.

The prefetch execution unit 170 may also prefetch data stored in the storage area 161d. However, prefetching the data stored in the storage area 161d is useful only when movement between the positions of the corresponding high load areas is detected for the first time. This is because, when movement between the positions of the corresponding high load areas is detected for the second time, the data in the previously detected high load area has already been prefetched when movement between the positions of the corresponding high load areas is detected for the first time.

Figure 14:
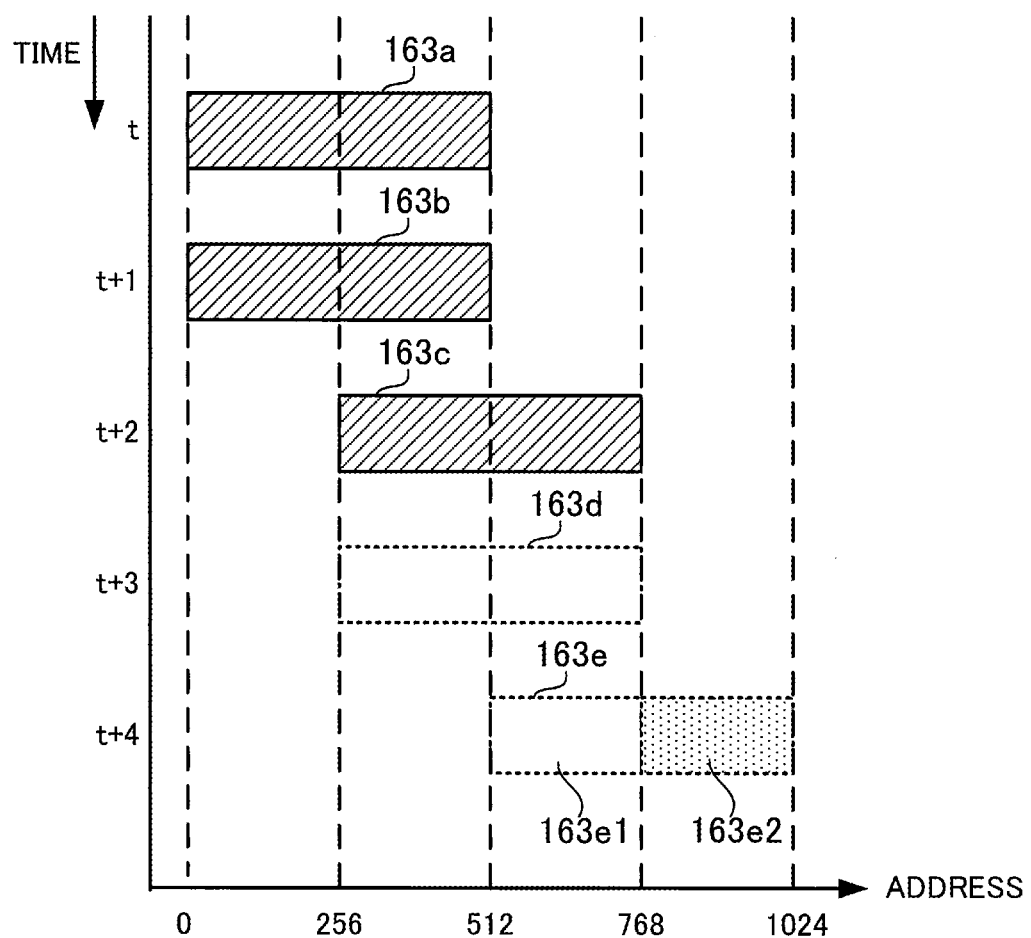
FIG. 14 illustrates another exemplary method of prefetching data.

FIG. 14 illustrates another exemplary method of prefetching data.

In FIG. 14, a high load area 163a is a high load area detected at time "t." The start address of the high load area 163a is "0," and the size of the high load area 163a is "512 MB." A high load area 163b is a high load area detected at time "t+1." As is the case with the high load area 163a, the start address of the high load area 163b is "0," and the size of the high load area 163b is "512 MB." A high load area 163c is a high load area detected at time "t+2." The start address of the high load area 163c is "256," and the size of the high load area 163c is "512 MB."

The following description will be made assuming that the average access numbers of the high load areas 163a to 163c have been determined to be approximately the same. In addition, a part of the high load area 163c overlaps the high load area 163b. Thus, the prefetch determination unit 160 determines access to the high load areas 163a to 163c corresponds to a macroscopically sequential access pattern.

In such case, the prefetch execution unit 170 predicts that accesses from the host apparatus 300 will be concentrated on a storage area 163d whose start address is "256" and size is "512 MB" at time "t+3." In addition, the prefetch execution unit 170 predicts that accesses from the host apparatus 300 will be concentrated on a storage area 163e whose start address is "512" and size is "512 MB" at time "t+4."

In such case, the prefetch execution unit 170 prefetches the data in the storage area 163e, which is predicted to be the next destination of the high load area. In addition, the data transfer speed during prefetching of the data in the storage area 163e is calculated as "512/(120−60)=8.5 [MB/second]." The prefetch execution unit 170 divides the storage area 163e into a plurality of areas, for example. Next, at the start time of the time period corresponding to time "t+4," the prefetch execution unit 170 starts to issue read request commands so that the contents of the divided areas are read at regular intervals within one minute.

In the storage area 163e predicted as the next destination of the high load area, the prefetch execution unit 170 may prefetch only the content of a storage area 163e2, which does not overlap any of the previously detected high load areas 163a to 163c.

However, prefetching the data stored in the storage area 163e1 that overlaps any of the previously detected high load area 163c is useful only when movement between the positions of the corresponding high load areas is detected for the first time. This is because, when movement between the positions of the corresponding high load areas is detected for the second time, the content in the storage area that overlaps any of the previously detected high load areas has already been prefetched when the movement between the positions of the corresponding high load areas is detected for the first time.

Next, processing for prefetching only the content in a storage area that does not overlap any of the previously detected high load areas, the storage area being predicted to be the next destination of the high load area, will be described in detail with reference to the example in FIG. 14.

At time "t+2," as described above, the storage area 163e is determined to be the storage area predicted to be the next destination of the high load area. At this point, the contents of the previously detected high load areas 163a and 163b are not stored in the prefetch area 201a. Thus, the prefetch execution unit 170 reads the entire content of the storage area 163e and writes the read content in the prefetch area 201a.

In addition, when the storage area 163e is actually detected as the high load area at time "t+4," a storage area (not illustrated) whose start address is "768" and size is "512 MB" is predicted to be the next destination of the high load area. However, in the storage area whose start address is "768" and size is "512 MB," the content of a storage area corresponding to the first 256 MB overlaps the content of the storage area 163e. Namely, the content is already stored in the prefetch area 201a by the end time of the time period corresponding to time "t+2." Therefore, at the end time of the time period corresponding to time "t+4," it is only necessary that the prefetch execution unit 170 writes the content of a storage area that corresponds to the next 256

MB and that does not overlap the storage area 163e in the prefetch area 201a, in the storage area whose start address is "768" and size is "512 MB."

In this way, the prefetch execution unit 170 may prefetch only the content of the storage area 163e2 that does not overlap any of the previously detected high load areas in the storage area predicted to be the next movement of the high load area. In this way, since the same content of a storage area in an HDD is not transferred to the prefetch area 201a redundantly, decrease in the performance of access to the HDD is prevented.

In addition, in the example in FIG. 14, when the contents of both the storage areas 163e1 and 163e2 are prefetched, the data transfer speeds for the storage areas 163e1 and 163e2 may be calculated individually. As can be seen from FIG. 14, it is likely that accesses from the host apparatus 300 will be concentrated on the storage area 163e1 also in the time period corresponding to time "t+3" prior to time "t+4." Thus, it is desirable that the content stored in the storage area 163e1 be transferred to the prefetch area 201a as quickly as possible. In contrast, it is not likely that accesses from the host apparatus 300 will be concentrated on the storage area 163e2 in the time period corresponding to time "t+3." Thus, it is only necessary that the transfer speed for the storage area 163e2 is calculated so that the entire content in the area is transferred (copied) within one minute by the start time of the time period corresponding to time "t+4."

Thus, the prefetch execution unit 170 may transfer the data in the storage area 163e1 at the upper limit of the transfer speed and the data in the storage area 163e2 at the transfer speed calculated in accordance with the above mathematical expression. As the "size of prefetched target area" set in the numerator of the expression, the size of the storage area 163e2 is set. In this way, the probability that the data in a storage area that the host apparatus 300 is predicted to access is already prefetched is increased, and as a result, the performance in responding to access requests is improved.

Next, processing executed by the storage control device 100 will be described with reference to the flowcharts in FIGS. 15 to 18. The following description will be made assuming that the storage control device 100 performs processing on an HDD 202 in the disk array 200.

Figure 15:
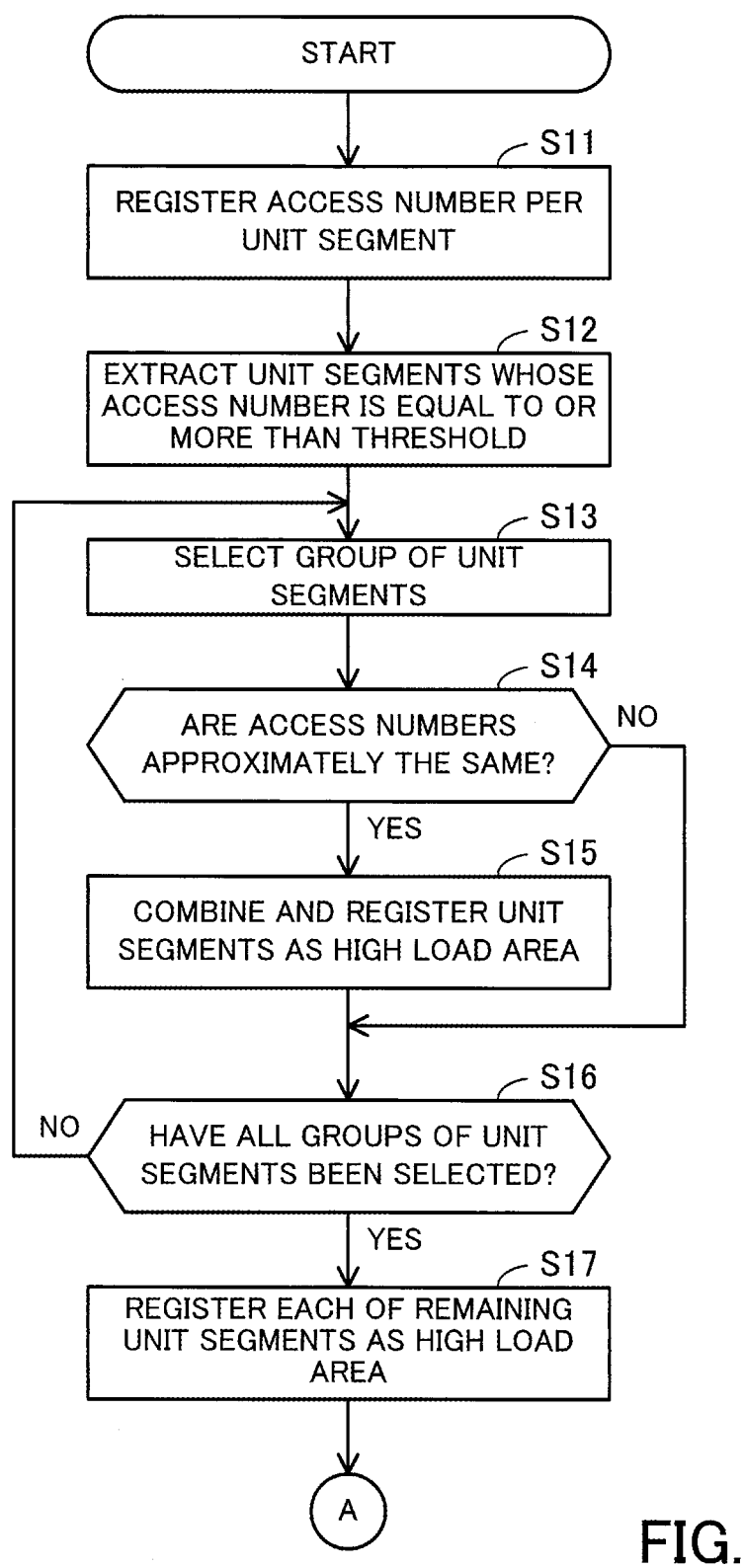
FIG. 15 is a flowchart illustrating exemplary processing for determining whether to prefetch data.
Figure 16:
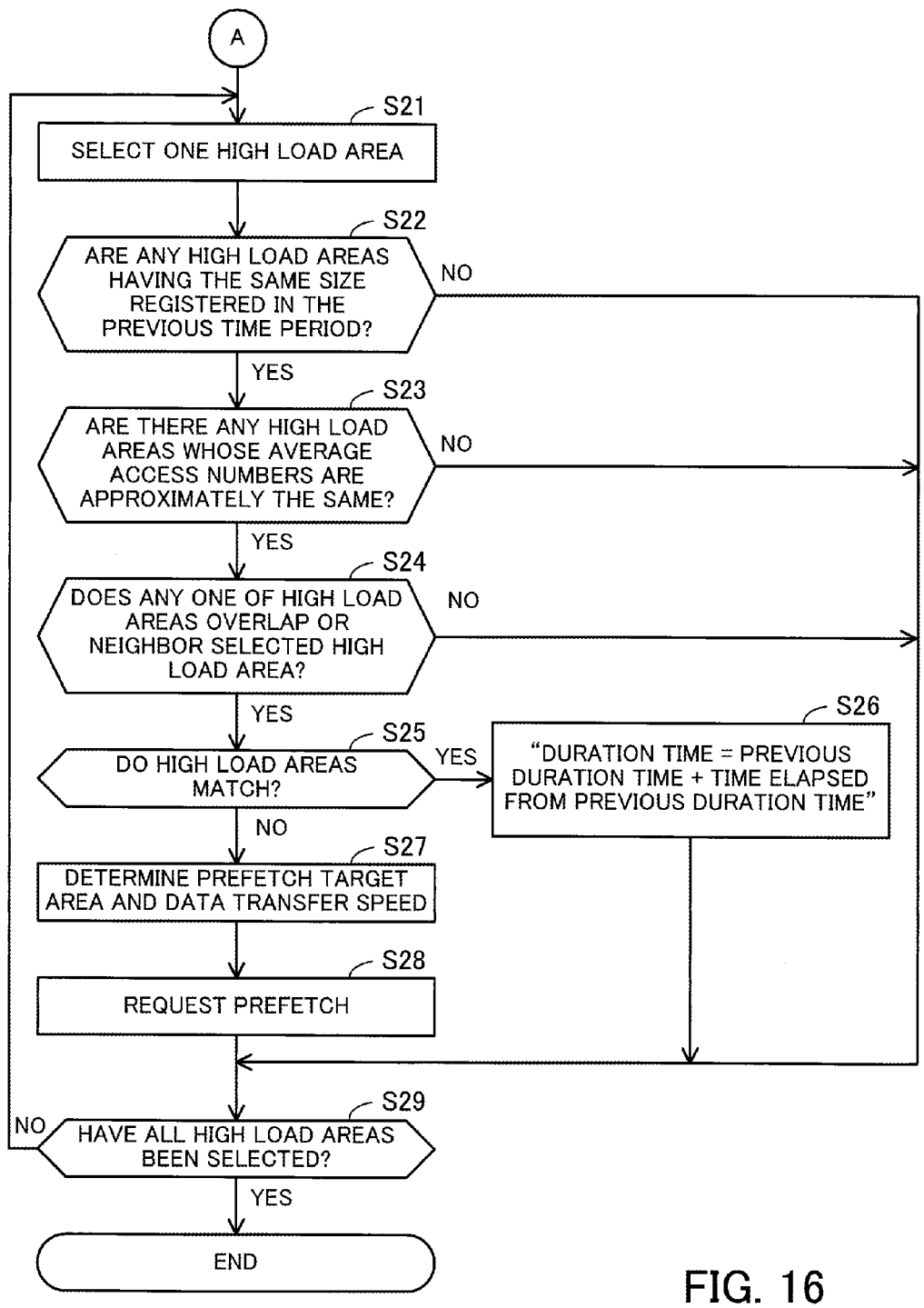
FIG. 16 is a flowchart illustrating processing that follows the processing illustrated in FIG. 15.

FIG. 15 is a flowchart illustrating exemplary processing for determining whether to prefetch data. The following description will be made assuming that the processing in FIGS. 15 and 16 is performed at certain time intervals ("1" minute in this example). In addition, before the processing in FIGS. 15 and 16 is started, the information registered in the access number information table 111 is cleared. Hereinafter, the processing illustrated in FIGS. 15 to 18 will be described step by step.

(S11) The access number acquisition unit 140 acquires information about an access number within a certain time period per unit segment in the HDD 202 and registers the information in the access number information table 111. In an entry under "Start address," the start address of a unit segment is set, and in an entry under "Access number," information about the access number of a unit segment is set.

The access numbers of the respective unit segments are acquired by monitoring access requests transmitted from the host apparatus 300 to the access control unit 130. In addition, the access numbers of the respective unit segments may also be acquired from a log of access requests transmitted from the host apparatus 300.

(S12) The high load area determination unit 150 extracts unit segments whose access numbers are equal to or more than a predetermined threshold (more than "0") from the unit segments registered in step S11. More specifically, the high load area determination unit 150 searches the access number information table 111 for records whose access numbers are equal to or more than a threshold.

(S13) From among the unit segments extracted in step S12, the high load area determination unit 150 determines a plurality of unit segments that are adjacent to each other to be a group of unit segments. More specifically, the high load area determination unit 150 searches the records found in step S12 for a plurality of records, the difference between the start addresses of the records being the size of the unit segment. For example, information about the size of the unit segment is set in advance in a storage area in the access number information storage unit 110. The same applies to the following.

If a plurality of groups of unit segments are determined, the high load area determination unit 150 selects one group of unit segments from the determined groups of unit segments.

(S14) The high load area determination unit 150 determines whether the access numbers of the unit segments included in the group of unit segments are approximately the same. For example, if the difference between the maximum value and the minimum value of the access numbers of the unit segments included in the selected group of unit segments is equal to or less than a predetermined rate of the maximum value (or the minimum value) (for example, 10%), the high load area determination unit 150 determines that the access numbers are approximately the same.

If the access numbers are approximately the same, processing proceeds to step S15. If not, processing proceeds to step S16.

(S15) The high load area determination unit 150 combines the unit segments included in the group of unit segments and registers the combined storage areas in the high load area information table 121 as a high load area. In an entry under "Detected time," information about the time, which is obtained by adding the value of the time intervals ("1" in this example) at which the present processing is executed to the detected time when the corresponding high load area is previously registered, is set. In an entry under "Start address," the start address of the high load area is set (the smallest address of the start addresses of the unit segments). In addition, in an entry under "Area size," the size of the high load area is set (the total size of the unit segments). In an entry under "Average access number," the average of the access numbers of the unit segments is set, and in an entry under "Duration time," the value of the time intervals at which the present processing is executed ("1" in this example) is set tentatively.

In steps S14 and S15, if three or more unit segments are included in the group of unit segments, there are cases where only some of the adjacent unit segments have approximately the same access number. In such cases, only the unit segments whose access numbers are approximately the same are combined and registered in the high load area information table 121.

(S16) The high load area determination unit 150 determines whether all the groups of unit segments determined in step S13 have been selected. If so, the processing proceeds to step S17. If there is an unselected group of unit segments, the processing proceeds to step S13.

(S17) Among the unit segments extracted in step S12, the high load area determination unit 150 registers unit segments that have not been combined in step S15 in the high load area information table 121 as high load areas. Among the contents registered in the high load area information table 121, the contents registered in the entries under "Detected time" and "Duration time" are the same as those registered in step S15. In addition, in an entry under "Start address," the start address of a corresponding unit segment is set, and in an entry under "Average access number," the access number of a corresponding unit segment is set.

FIG. 16 is a flowchart illustrating processing that follows the processing illustrated in FIG. 15.

(S21) The prefetch determination unit 160 selects one high load area registered in the most-recent time period, which is the current processing target period, (namely, in the time period indicated by the detected time registered in step S15 or S17). More specifically, the prefetch determination unit 160 searches the high load area information table 121 for records including the largest (most-recent) detected time and selects one of the records retrieved.

(S22) The prefetch determination unit 160 selects high load areas having the same size as that of the high load area selected in step S21 from the high load areas registered in the previous time period as follows. First, the prefetch determination unit 160 searches the high load area information table 121 for records including the previous detected time ("most-recent detected time—value of time intervals at which the present processing is executed"). Next, the prefetch determination unit 160 searches the retrieved records for records each including an area size that matches that of the record selected in step S21.

The prefetch determination unit 160 determines whether high load areas having the same size have been retrieved from the high load areas registered in the previous time period (namely, whether high load areas having the same size have been registered in the previous time period). If so, the processing proceeds to step S23. If not, the processing proceeds to step S29.

(S23) The prefetch determination unit 160 searches the high load areas retrieved in step S22 for high load areas whose average access numbers are approximately the same as that of the high load area selected in step S21. More specifically, the prefetch determination unit 160 searches the records retrieved in step S22 for records whose average access numbers are approximately the same as that of the record selected in step S21.

The prefetch determination unit 160 determines whether any high load areas whose average access numbers are approximately the same as that of the high load area selected in step S21 have been retrieved. Namely, the prefetch determination unit 160 determines whether the high load areas retrieved in step S22 includes any high load areas whose average access numbers are approximately the same as that of the high load area selected in step S21.

If the high load areas retrieved in step S22 includes high load areas whose average access numbers are approximately the same as that of the high load area selected in step S21, the processing proceeds to step S24. If not, the processing proceeds to step S29.

(S24) The prefetch determination unit 160 determines whether any one of the high load areas retrieved in step S23 overlaps or neighbors the high load area selected in step S21. If a high load area overlaps or neighbors the high load area selected in step S21, the processing proceeds to step S25. If a high load area does not overlap or neighbor the high load area selected in step S21, the processing proceeds to step S29.

(S25) The prefetch determination unit 160 determines whether the difference between the start address of a high load area retrieved in step S24 and the start address of the high load area selected in step S21 is "0." More specifically, the prefetch determination unit 160 determines whether the start address of the record selected in step S21 matches the start address of a record retrieved in step S24. Namely, the prefetch determination unit 160 determines whether the position of the high load area retrieved in step S24 matches the position of the high load area selected in step S21.

If these high load areas match, the processing proceeds to step S26. If not (namely, if only a part of the high load area overlaps the high load area retrieved in step S24 or if these high load areas are adjacent to each other), the processing proceeds to step S27.

(S26) The prefetch determination unit 160 updates the duration time for the high load area selected in step S21 by "the duration time for the high load area retrieved in step S24+ the time intervals at which the present processing is executed." More specifically, the prefetch determination unit 160 updates the duration time for the record selected in step S21 by "the duration time for the high load area retrieved in step S24+ the time intervals at which the present processing is executed." Next, the processing proceeds to step S29.

(S27) If "NO" is determined in step S25, movement between the positions of the high load areas is detected. The prefetch execution unit 170 determines a prefetch target area on the basis of the direction of the movement between the positions of the high load areas and the amount of movement.

The prefetch determination unit 160 determines the direction of the movement between the high load areas by comparing the start address of the high load area retrieved in step S24 and the start address of the high load area selected in step S21. If the former is smaller, the prefetch determination unit 160 determines that the movement between the positions of the high load areas has occurred in the direction of a larger address number. If the latter is smaller, the prefetch determination unit 160 determines that the movement between the positions of the high load areas has occurred in the direction of a smaller address number. Hereinafter, as needed, the direction of a larger address number will be referred to as "backward," and the direction of a smaller address number will be referred to as "forward."

The prefetch determination unit 160 determines a storage area, which is obtained by shifting the position of the high load area selected in step S21 by the difference between the start address of the high load area retrieved in step S24 and the start address of the high load area selected in step S21 (Namely, by the movement amount) in the determined movement direction, to be a prefetch target area.

As described with reference to FIG. 14, the prefetch determination unit 160 may determine only the storage area that does not overlap a previously detected high load area to be the final prefetch target area, in the prefetch target area determined in accordance with the above procedure.

In addition, on the basis of the amount of the movement between the positions of the high load areas and the time needed for the movement, the prefetch determination unit 160 determines the speed at which data stored in the determined prefetch target area is transferred, in accordance with the above mathematical expression. The time needed for the movement may be acquired from an entry under "Duration time" of the record selected in step S21.

(S28) The prefetch determination unit 160 notifies the prefetch execution unit 170 of information about the prefetch target area determined in step S27 (for example, the start address and the area size) and the data transfer speed and requests the prefetch execution unit 170 to prefetch data. Accordingly, the prefetch execution unit 170 prefetches the relevant data in the prefetch target area. The prefetch processing will be described in detail with reference to FIG. 17.

Instead of the data transfer speed, the prefetch determination unit 160 may notify the prefetch execution unit 170 of the size of the prefetch target area (namely, the value of the numerator in the above mathematical expression) and the time left until the start time of the time period when the position of the high load area is predicted to move next (namely, the value of the denominator in the above mathematical expression).

(S29) The prefetch determination unit 160 determines whether all the high load areas registered in the most-recent time period have been selected in step S21. If so, the processing proceeds to END. If there is still an unselected high load area, the processing returns to step S21.

Figure 17:
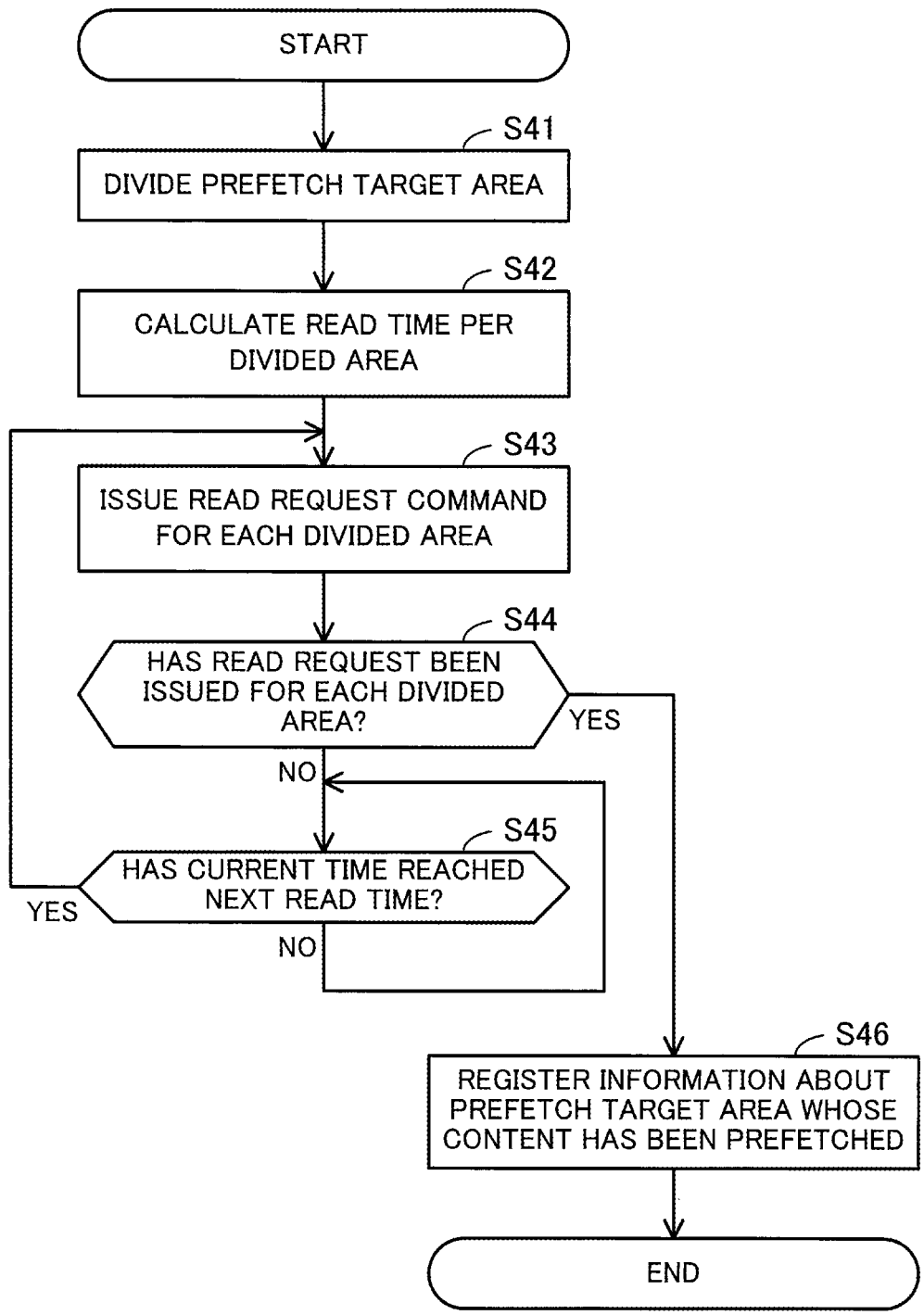
FIG. 17 is a flowchart illustrating exemplary prefetch processing.

FIG. 17 is a flowchart illustrating exemplary prefetch processing. The processing illustrated in FIG. 17 is executed per prefetch target area when the prefetch execution unit 170 is notified of a prefetch request in step S28 in FIG. 16. The prefetch execution unit 170 is notified of, in addition to a prefetch request, information about the prefetch target area and the data transfer speed as prefetch information. Hereinafter, the processing illustrated in FIG. 17 will be described step by step.

(S41) The prefetch execution unit 170 divides a prefetch target area into a predetermined number of areas. The number of areas into which the prefetch target area is divided may vary depending on the size of the prefetch target area or the data transfer speed.

(S42) The prefetch execution unit 170 calculates the read time per divided area so that the content of each divided area is transferred to the prefetch area 201a at the data transfer speed supplied by the prefetch determination unit 160. Each divided area is read at certain time intervals. The read time of the first divided area is the current time.

(S43) The prefetch execution unit 170 creates a read request command for reading and transferring the content of the divided area whose read time matches the current time from the HDD 202 to the prefetch area 201a and issues the created read request command to the HDD 202. In this way, the entire content of this divided area is copied from the HDD 202 to the prefetch area 201a.

If the prefetch area 201a does not have any available space, the prefetch execution unit 170 may end the present processing (prefetch processing).

(S44) The prefetch execution unit 170 determines whether a read request has been issued for each of the divided areas obtained in step S41. If so, the processing proceeds to step S46. If there is a divided area for which a read request has not been issued, the processing proceeds to step S45.

(S45) The prefetch execution unit 170 determines whether the current time has reached the read time for the next divided area requested to be read. This determination processing in step S45 is repeated until the current time reaches the next read time. When the current time reaches the next read time, processing proceeds to step S43.

(S46) If "YES" is determined in step S44, the prefetch execution unit 170 determines that prefetching the content of a single prefetch target area has been completed. The prefetch execution unit 170 registers information about the prefetch target area whose content has been prefetched in the prefetch management table 122 (the read source address, the write destination address, the area size, and the prefetched time).

Figure 18:
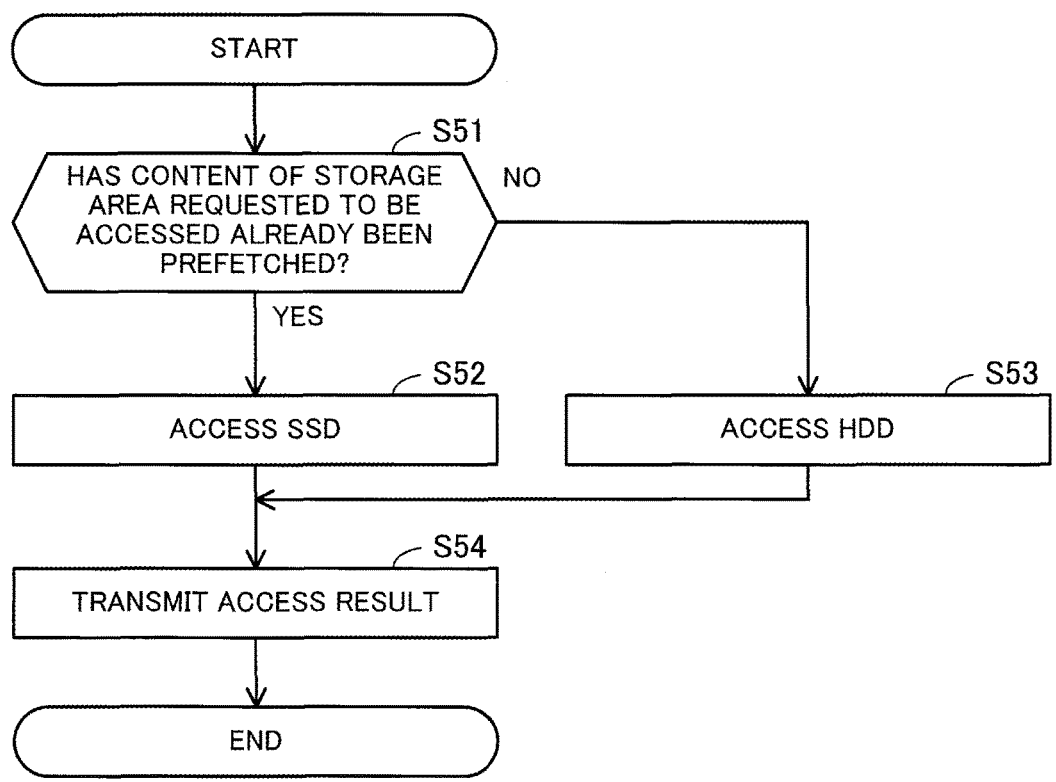
FIG. 18 is a flowchart illustrating exemplary access control processing.

FIG. 18 is a flowchart illustrating exemplary access control processing. The processing illustrated in FIG. 18 is executed when an access request is transmitted from the host apparatus 300 to the HDD 202. The access request includes information about the start address of a storage area in the HDD 202 to be accessed and information about the size of the storage area. Hereinafter, the processing illustrated in FIG. 18 will be described step by step.

(S51) The access control unit 130 determines whether the content of the storage area requested to be accessed has already been prefetched by matching the information about the storage area requested to be accessed against the prefetch management table 122. If the content of the storage area requested to be accessed has already been prefetched, the processing proceeds to step S52. If not, the processing proceeds to step S53.

(S52) On the basis of the information registered in the prefetch management table 122, the access control unit 130 accesses the prefetch area 201a in the SSD 201.

More specifically, when receiving a read request from the host apparatus 300, the access control unit 130 refers to the information registered in the prefetch management table 122 and acquires information about a storage area in the SSD 201, the storage area including the content requested to be read. The access control unit 130 issues a read request command in which the acquired information about the storage area is set as the read source information to the SSD 201. In this way, the corresponding data is read from the prefetch area 201a in the SSD 201, and the access control unit 130 receives the read data.

In addition, if the host apparatus 300 requests data writing, the access control unit 130 refers to the information registered in the prefetch management table 122 and acquires information about a storage area in the SSD 201, the storage area corresponding to the storage area in the HDD 202 in which data is requested to be written. The access control unit 130 issues a write request command, in which the acquired storage area information is set as the write-destination information, to the SSD 201. In this way, the data requested to be written is written in the corresponding area in the prefetch area 201a in the SSD 201 and the content of the corresponding area is updated.

If such data writing is performed, the access control unit 130 writes the updated data in the prefetch area 201a in the corresponding storage area in the HDD 202 at certain timing later. In this way, the data in the prefetch area 201a and the data in the HDD 202 are synchronized.

(S53) The access control unit 130 accesses the corresponding data in the HDD 202. More specifically, the access control unit 130 issues an access request command, in which the storage area in the HDD 202 requested by the host apparatus 300 is set as the access destination, to the HDD 202.

(S54) The access control unit 130 transmits an access result to the host apparatus 300. More specifically, if a data read request is transmitted from the host apparatus 300, the access control unit 130 transmits the data read from the prefetch area 201a or the HDD 202 to the host apparatus 300. In contrast, if a data write request is transmitted from the host apparatus 300, the access control unit 130 transmits a notification of completion of the writing to the host apparatus 300.

As described with reference to FIG. 18, when the host apparatus 300 transmits a read request, if the data requested to be read is stored in the prefetch area 201a in the SSD 201, the access control unit 130 reads the data from the prefetch area 201a. In contrast, if the data requested to be read is not stored in the prefetch area 201a, the access control unit 130 reads the data from the corresponding storage area in the HDD 202.

In addition, when the host apparatus 300 transmits a write request, if the content of the storage area in which data is requested to be written has already been prefetched, the access control unit 130 writes the data in the corresponding storage area in the prefetch area 201*a*. If the content of the storage area in which data is requested to be written has not been prefetched, the access control unit 130 writes the data in the storage area in the HDD 202.

The speed at which data in the SSD 201 is accessed is faster than the speed at which data in the HDD 202 is accessed. Thus, when the host apparatus 300 requests access to a storage area whose content has been prefetched, the storage control device 100 accesses to the storage area at high speed in response to the request. Thus, if the host apparatus 300 transmits more access requests directed to storage areas whose contents have been prefetched, the performance of the storage apparatus in responding to the access requests transmitted from the host apparatus 300 is improved further.

The storage apparatus 2 according to the second embodiment detects storage areas which are evenly accessed and on which accesses are concentrated as a high load area. In addition, by monitoring the movement between the positions of detected high load areas over time, the storage apparatus 2 determines whether a macroscopically sequential access pattern has occurred.

In addition, if occurrence of a macroscopically sequential access pattern is determined, a storage area on which accesses will be concentrated in the future is predicted on the basis of the movement between the positions of the high load areas, and the content in the predicted storage area is prefetched. In this way, the accuracy in predicting a storage area requested to be accessed by the host apparatus 300 is improved, and the probability that the host apparatus 300 requests access to a storage area whose content has been prefetched is increased. Thus, the performance of the storage apparatus 2 in responding to access requests from the host apparatus 300 is improved.

The storage apparatus 2 according to the second embodiment uses each storage device in the HDD 202 as a source from which prefetched data is read and the SSD 201 as a destination in which prefetched data is written. However, as long as the data transfer speed of a storage device used as a destination in which prefetched data is written is faster than the data transfer speed of a storage device used as a source from which prefetched data is read, the configuration of the storage apparatus 2 is not limited to the above configuration. For example, an SSD may be used as a read-source storage device from which prefetched data is read, and a RAM may be used as a write-destination storage device in which prefetched data is written.

In addition, while the storage apparatus 2 according to the second embodiment prefetches data at the same time intervals as certain time intervals at which a high load area is detected, the storage apparatus 2 may prefetch data at different time intervals from the certain time intervals at which a high load area is detected.

In addition, while the storage apparatus 2 according to the second embodiment deletes data in a storage area that has not been used for a certain time period in the prefetch area 201*a*, the storage apparatus 2 may delete data in a storage area whose access number is small.

As described above, the information processing according to the first embodiment may be realized by causing the storage apparatus 10 to execute a program, and the information processing according to the second embodiment may be realized by causing the storage control device 100 to execute a program. Each of the programs may be recorded in a computer-readable recording medium. Examples of the recording medium include a magnetic disk, an optical disc, a magneto-optical disk, and a semiconductor memory. Examples of the magnetic disk include an FD and an HDD. Examples of the optical disc include a CD, a CD-R (Recordable)/RW (Rewritable), a DVD, and DVD-R/RW.

One way to distribute the programs is to provide portable recording media in which the programs are recorded. In addition, the programs may be stored in a storage device of another computer and distributed via a network. For example, a computer stores such a program recorded in a portable recording medium or forwarded from another computer in a storage device (HDD 103, for example). Next, the computer reads the program from the storage device and executes the program. The computer may directly read the program from the portable recording medium or directly executes the program received from another computer via a network. At least part of the above information processing may be realized by an electric circuit such as a digital signal processor (DSP), an application specific integrated circuit (ASIC), or a programmable logic device (PLD).

In one aspect of the embodiments, the speed in responding to access requests is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. A storage apparatus comprising:
a first storage device including a plurality of unit storage areas each having a certain size;
a second storage device that provides faster access than the first storage device; and
a control device that controls access to the first storage device, wherein:
the control device extracts, from the plurality of unit storage areas, monitored areas formed by consecutive unit storage areas at certain time intervals, the consecutive unit storage areas having been accessed at least a predetermined number of times that is greater than zero and being similar to each other in the number of times of access;
the control device determines, upon detecting movement of address ranges between same-sized monitored areas among extracted monitored areas in the first storage device over time, a first storage area out of the plurality of unit storage areas based on direction of the movement of the address ranges between the same-sized monitored areas, the first storage area different from the monitored areas and equal in size to the monitored areas, the first storage area being predicted to be accessed;
the control device performs a first control operation so that content of the first storage area is copied to a second storage area of the second storage device; and the control device performs, upon receiving a request for access to the first storage area, a second control operation so that the second storage area is accessed instead of the first storage area.

2. The storage apparatus according to claim 1, wherein, in detecting the movement of the address ranges between the same-sized monitored areas, the control device determines the movement of the address ranges between the same-sized monitored areas in the first storage device when the same-sized monitored areas are extracted in adjacent time periods in the certain time intervals and the extracted same-sized monitored areas partially overlap or are adjacent to each other.

3. The storage apparatus according to claim 2, wherein, in detecting the movement of the address ranges between the same-sized monitored areas, the control device determines to use same-sized monitored areas being similar to each other in the number of times of access and having been extracted in adjacent time periods in the certain time intervals, for determining the movement.

4. The storage apparatus according to claim 2, wherein, when the control device determines the movement of the address ranges between the same-sized monitored areas in the first storage device that are extracted in adjacent time periods in the certain time intervals, the control device determines unit storage areas obtained by shifting an address of a most-recent one of the same-sized monitored areas by an amount of the movement of the address ranges to be the first storage area.

5. The storage apparatus according to claim 4, wherein the control device performs the first control operation so that content in the first storage area that has not been copied to the second storage device is copied to the second storage device.

6. The storage apparatus according to claim 1, wherein, when the control device detects the movement of the address ranges between the same-sized monitored areas in the first storage device over time and determines the first storage area, the control device controls speed at which the content of the first storage area is copied to the second storage device based on speed of the movement of the address ranges between the same-sized monitored areas.

7. A storage control method for controlling access to a first storage device, the storage control method comprising:
- extracting, by a control device, from a plurality of unit storage areas each having a certain size in the first storage device, monitored areas formed by consecutive unit storage areas at certain time intervals, the consecutive unit storage areas having been accessed at least a predetermined number of times that is greater than zero and being similar to each other in the number of times of access;
- determining, by the control device, upon detecting movement of address ranges between same-sized monitored areas among extracted monitored areas in the first storage device over time, a first storage area out of the plurality of unit storage areas based on direction of the movement of the address ranges between the same-sized monitored areas, the first storage area different from the monitored areas and equal in size to the monitored areas, the first storage area being predicted to be accessed;
- performing, by the control device, a first control operation so that content of the first storage area is copied to a second storage area of a second storage device, the second storage device providing faster access than the first storage device; and
- performing, by the control device, upon receiving a request for access to the first storage area, a second control operation so that the second storage area is accessed instead of the first storage area.

8. The storage control method according to claim 7, wherein the detecting includes determining the movement of the address ranges between the same-sized monitored areas in the first storage device when the same-sized monitored areas are extracted in adjacent time periods in the certain time intervals and the extracted same-sized monitored areas partially overlap or are adjacent to each other.

9. The storage control method according to claim 8, wherein the detecting includes determining to use same-sized monitored areas being similar to each other in the number of times of access and having been extracted in adjacent time periods in the certain time intervals, for determining the movement.

10. The storage control method according to claim 8, further comprising determining, upon determining the movement of the address ranges between the same-sized monitored areas in the first storage device that are extracted in adjacent time periods, unit storage areas obtained by shifting an address of a most-recent one of the same-sized monitored areas by an amount of the movement in the direction of the movement of the address ranges to be the first storage area.

11. The storage control method according to claim 10, wherein the second control operation is performed so that content in the first storage area that has not been copied to the second storage device is copied to the second storage device.

12. The storage control method according to claim 8, further comprising controlling, upon detecting the movement of the address ranges between of the same-sized monitored areas in the first storage device over time and determining the first storage area, speed at which the content of the first storage area is copied to the second storage device based on speed of the movement of the address ranges between the same-sized monitored areas.

13. A non-transitory computer-readable recording medium storing a storage control program that causes a computer to perform a process for controlling access to a first storage device, the process comprising:
- extracting, from a plurality of unit storage areas each having a certain size in the first storage device, monitored areas formed by consecutive unit storage areas at certain time intervals, the consecutive unit storage areas having been accessed at least a predetermined number of times that is greater than zero and being similar to each other in the number of times of access;
- determining, upon detecting movement of address ranges between same-sized monitored areas among extracted monitored areas in the first storage device over time, a first storage area out of the plurality of unit storage areas based on direction of the movement of the address ranges between the same-sized monitored areas, the first storage area different from the monitored areas and equal in size to the monitored areas, the first storage area being predicted to be accessed;
- performing a first control operation so that content of the first storage area is copied to a second storage area of a second storage device, the second storage device providing faster access than the first storage device; and
- performing, upon receiving a request for access to the first storage area, a second control operation so that the second storage area is accessed instead of the first storage area.

* * * * *